United States Patent
Lee

(10) Patent No.: US 11,502,877 B2
(45) Date of Patent: Nov. 15, 2022

(54) SIGNAL TRANSMITTING DEVICE, SIGNAL RECEIVING DEVICE, TRANSMITTING AND RECEIVING SYSTEM USING THE SIGNAL TRANSMITTING AND RECEIVING DEVICES, AND TRANSMITTING AND RECEIVING METHOD

(71) Applicant: SK hynix Inc., Icheon-si (KR)

(72) Inventor: Hyun Bae Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/461,404

(22) Filed: Aug. 30, 2021

(65) Prior Publication Data

US 2022/0311646 A1    Sep. 29, 2022

(30) Foreign Application Priority Data

Mar. 23, 2021    (KR) .......................... 10-2021-0037594

(51) Int. Cl.
*H04L 25/02*    (2006.01)

(52) U.S. Cl.
CPC ........ *H04L 25/0278* (2013.01); *H04L 25/028* (2013.01)

(58) Field of Classification Search
CPC .......................... H04L 25/0278; H04L 25/028
See application file for complete search history.

(56) References Cited

U.S. PATENT DOCUMENTS

| 7,113,550 B2 | 9/2006 | Stonecypher et al. |
| 2004/0001561 A1* | 1/2004 | Dent ...................... H04L 27/186 375/308 |
| 2006/0071830 A1* | 4/2006 | Suzuki .................... H03M 7/40 341/67 |

* cited by examiner

*Primary Examiner* — Sung S Ahn
(74) *Attorney, Agent, or Firm* — William Park & Associates Ltd.

(57) ABSTRACT

A signal transmitting device includes an output control circuit and a transmitting circuit. The output control circuit generates a first encoded symbol, a second encoded symbol, a third encoded symbol, and a fourth encoded symbol and an inverted flag signal by inverting the logic levels of second bits of a first symbol, a second symbol, a third symbol, and a fourth symbol, and generates a first output control signal and a second output control signal based on the first to fourth encoded symbols, when the maximum transition is present among the first to fourth symbols. The transmitting circuit may transmit the inverted flag signal and a Tx (Transmit) signal generated based on the first and second output control signals.

21 Claims, 12 Drawing Sheets

FIG. 11A

<Before encoding>

| M<0> | L<0> | M<1> | L<1> | M<2> | L<2> | M<3> | L<3> | TS | | | |
|---|---|---|---|---|---|---|---|---|---|---|---|
| 1 | 0 | 1 | 1 | 1 | 1 | 1 | 1 | V3 | V1 | V1 | V1 |
| 0 | 0 | 1 | 1 | 1 | 1 | 1 | 1 | V4 | V1 | V1 | V1 |

Maximum transition    Full swing

<After encoding>

| ME<0> | LE<0> | ME<1> | LE<1> | ME<2> | LE<2> | ME<3> | LE<3> | TS | | | | LSBI |
|---|---|---|---|---|---|---|---|---|---|---|---|---|
| 1 | 0 | 1 | 1 | 1 | 1 | 1 | 1 | V3 | V1 | V1 | V1 | 0 |
| 0 | 1 | 1 | 0 | 1 | 0 | 1 | 0 | V2 | V3 | V3 | V3 | 1 |

FIG. 11B

<Before encoding>

| M<0> | L<0> | M<1> | L<1> | M<2> | L<2> | M<3> | L<3> | TS | | | |
|---|---|---|---|---|---|---|---|---|---|---|---|
| 0 | 0 | 1 | 1 | 0 | 1 | 1 | 0 | V4 | V1 | V2 | V3 |

Maximum transition — Full swing

<Inversion of second bits of all symbols>

| M<0> | L<0>' | M<1> | L<1>' | M<2> | L<2>' | M<3> | L<3>' | TS | | | | LSBI |
|---|---|---|---|---|---|---|---|---|---|---|---|---|
| 0 | 1 | 1 | 0 | 0 | 0 | 1 | 1 | V2 | V3 | V4 | V1 | 1 |

Maximum transition — Full swing

<Re-inversion of second bits of edge symbols>

| ME<0> | LE<0> | ME<1> | LE<1> | ME<2> | LE<2> | ME<3> | LE<3> | TS | | | |
|---|---|---|---|---|---|---|---|---|---|---|---|
| 0 | 0 | 1 | 0 | 0 | 0 | 1 | 0 | V4 | V3 | V4 | V3 |

SIGNAL TRANSMITTING DEVICE, SIGNAL RECEIVING DEVICE, TRANSMITTING AND RECEIVING SYSTEM USING THE SIGNAL TRANSMITTING AND RECEIVING DEVICES, AND TRANSMITTING AND RECEIVING METHOD

CROSS-REFERENCES TO RELATED APPLICATION

The present application claims priority under 35 U.S.C. § 119(a) to Korean application number 10-2021-0037594, filed on Mar. 23, 2021, in the Korean Intellectual Property Office, which is incorporated herein by reference in its entirety.

BACKGROUND

1. Technical Field

Various embodiments generally relate to an integrated circuit technology, and more particularly, to a signal transmitting circuit, a signal receiving circuit, a transmitting and receiving system using the signal transmitting and receiving circuits, and a transmitting and receiving method.

2. Related Art

An electronic device may include a number of electronic components. Among the electronic components, a computer system may include a number of semiconductor apparatuses constituted by semiconductors. The semiconductor apparatuses constituting the computer system may transmit and receive a clock signal and data to communicate with each other. The semiconductor apparatuses may be each coupled to another semiconductor apparatus through a signal bus such as a data bus, and transmit a signal having information corresponding to data through the signal bus. The semiconductor apparatuses may each include a signal transmitting circuit to transmit the signal through the signal bus, and the signal transmitting circuit may transmit an analog voltage through the signal bus, in order to transmit the signal. In general, the signal transmitting circuit may transmit an analog voltage corresponding to a high logic level and an analog voltage corresponding to a low logic level. However, in order to transmit more pieces of information through one signal transmission, a multi-level signal transmitting method using PAM (Pulse Amplitude Modulation) is used. The multi-level signal transmitting method may divide the level of the analog voltage transmitted through the signal bus, and transmit 2 or more-bit digital information as one analog signal.

SUMMARY

In an embodiment, a signal transmitting device may include an output control circuit and a transmitting circuit. The output control circuit may be configured to generate a first symbol, a second symbol, a third symbol, and a fourth symbol each having a first bit and a second bit corresponding to an output data stream, generate a first encoded symbol, a second encoded symbol, a third encoded symbol, and a fourth encoded symbol and an inverted flag signal by inverting the logic levels of second bits of the first symbol, the second symbol, the third symbol, and the fourth symbol, and generate a first output control signal and a second output control signal based on the first to fourth encoded symbols, when the maximum transition is present among the first to fourth symbols. The transmitting circuit may be configured to transmit the inverted flag signal and a Tx (Transmit) signal generated based on the first and second output control signals.

In an embodiment, a transmitting and receiving system may include a signal transmitting device and a signal receiving device. The signal transmitting device may be configured to transmit a Tx signal having a plurality of voltage levels. The signal receiving device may be configured to receive the Tx signal. The signal transmitting device may include an output circuit and a transmitting circuit. The output control circuit may be configured to generate a first symbol, a second symbol, a third symbol, and a fourth symbol each having a first bit and a second bit corresponding to an output data stream, generate a first encoded symbol, a second encoded symbol, a third encoded symbol, and a fourth encoded symbol and an inverted flag signal by inverting the logic levels of second bits of the first symbol, the second symbol, the third symbol and a fourth symbol, and generate a first output control signal and a second output control signal based on the first to fourth encoded symbols, when the maximum transition is present among the first to fourth symbols. The transmitting circuit may be configured to transmit the inverted flag signal and a Tx signal generated based on the first and second output control signals. The signal receiving device may include a receiving circuit and an input control circuit. The receiving circuit may be configured to generate an Rx (Receive) symbol based on the Tx signal, and receive the inverted flag signal. The input control circuit may be configured to recover the first to fourth symbols based on the Rx symbol and the inverted flag signal.

In an embodiment, a transmitting and receiving method may include generating a first symbol, a second symbol, a third symbol, and a fourth symbol, each of which includes a first bit and a second bit, based on a plurality of data. The method may include generating an inverted flag signal, inverting the logic levels of the second bits of the first to fourth symbols, and providing the first to fourth symbols including the inverted second bits as a first encoded symbol, a second encoded symbol, a third encoded symbol, and a fourth encoded symbol, when the maximum transition is present among the first to fourth symbols. And the method may include transmitting the inverted flag signal and a Tx signal generated based on the first to fourth encoded symbols.

BRIEF DESCRIPTION OF THE DRAWINGS

FIGS. 11A and 11B are tables showing symbols and Tx signals which are generated through the signal transmitting device in accordance with the present embodiments.

DETAILED DESCRIPTION

Hereinafter, a signal transmitting circuit, a signal receiving circuit, a transmitting and receiving system using the signal transmitting and receiving circuits, and a transmitting and receiving method according to the present disclosure will be described below with reference to the accompanying drawings through examples of embodiments.

Figure 1:
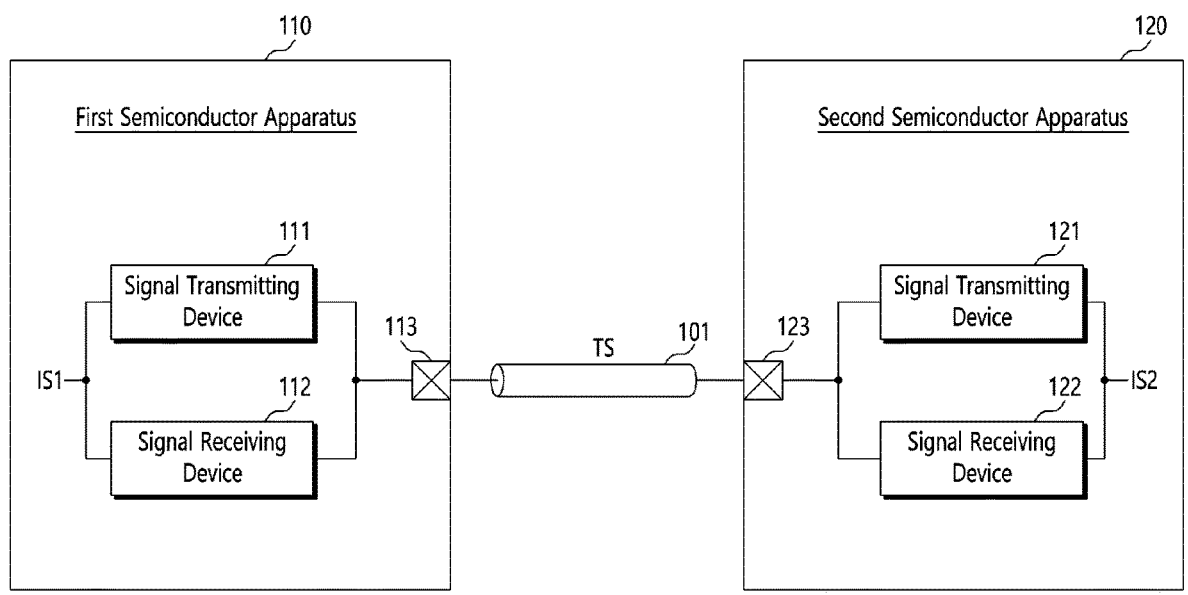
FIG. 1 is a diagram illustrating a configuration of a semiconductor system in accordance with an embodiment, and the voltage levels of a Tx (Transmit) signal transmitted through a Tx signal bus.
Figure 1:
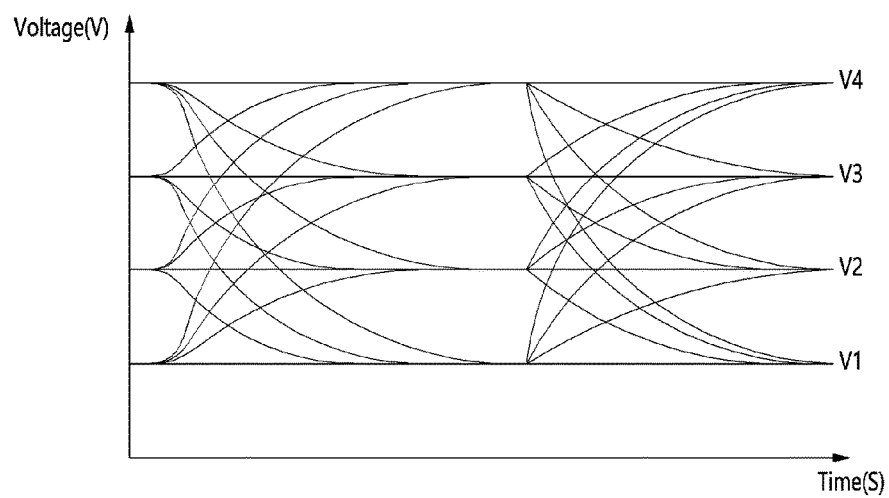

FIG. 1 is a diagram illustrating a configuration of a semiconductor system 1 in accordance with an embodiment, and the voltage levels of a Tx signal TS transmitted through a Tx signal bus 101. Referring to FIG. 1, the semiconductor system 1 may include a first semiconductor apparatus 110 and a second semiconductor apparatus 120. The first semiconductor apparatus 110 may provide various control signals required for the second semiconductor apparatus 120 to operate. The first semiconductor apparatus 110 may include various types of host apparatuses. For example, the first semiconductor apparatus 110 may include one or more of a CPU (Central Processing Unit), a GPU (Graphics Processing Unit), an MMP (Multi-Media Processor), a digital signal processor, an AP (Application Processor) and a memory controller. The second semiconductor apparatus 120 may be a memory apparatus, for example, and the memory apparatus may include a volatile memory and a nonvolatile memory. The examples of the volatile memory may include an SRAM (Static RAM), DRAM (Dynamic RAM) and SDRAM (Synchronous DRAM), and the examples of the nonvolatile memory may include a ROM (Read Only Memory), PROM (Programmable ROM), EEPROM (Electrically Erasable and Programmable ROM), EPROM (Electrically Programmable ROM), flash memory, PRAM (Phase change RAM), MRAM (Magnetic RAM), RRAM (Resistive RAM) and FRAM (Ferroelectric RAM).

The second semiconductor apparatus 120 may be coupled to the first semiconductor apparatus 110 through a plurality of buses. The plurality of buses may be signal transmitting lines, links or channels for transmitting signals. Although not illustrated, the plurality of buses may include a clock bus, a command address bus, a data bus and the like, for example. The clock bus and the command address bus may be a unidirectional bus, and the data bus may be a bidirectional bus. The second semiconductor apparatus 120 may be coupled to the first semiconductor apparatus 110 through the Tx signal bus 101. The Tx signal bus 101 may include any types of buses configured to transmit a signal synchronized with a clock signal. For example, the Tx signal bus 101 may be a bidirectional bus like the data bus. In an embodiment, the Tx signal bus 101 may be a unidirectional bus. Even when the Tx signal bus 101 is a unidirectional bus, the technical idea of the present disclosure may be applied in a similar manner. The Tx signal TS transmitted through the Tx signal bus 101 may be a multi-level signal, and the Tx signal bus 101 may be a multi-level signal transmitting line for transmitting a multi-level signal. For example, the Tx signal TS may have at least four different voltage levels. According to the value of a symbol, the Tx signal TS may have one voltage level of the four different voltage levels. The symbol may include two or more binary bits. The symbol may have at least a first state, a second state, a third state and a fourth state. The first state may correspond to a logic value of '0, 0', the second state may correspond to a logic value of '0, 1', the third state may correspond to a logic value of '1, 0', and the fourth state may correspond to a logic value of '1, 1'. The Tx signal TS may have a first voltage level V1, a second voltage level V2, a third voltage level V3 and a fourth voltage level V4. The graph illustrated in FIG. 1 shows the voltage levels of the Tx signal TS transmitted through the Tx signal bus 101. In the graph, the x-axis may indicate time, and the y-axis may indicate voltage. In order to transmit a symbol having the first state, the Tx signal TS may have the first voltage level V1. In order to transmit a symbol having the second state, the Tx signal TS may have the second voltage level V2. In order to transmit a symbol having the third state, the Tx signal TS may have the third voltage level V3. In order to transmit a symbol having the fourth state, the Tx signal TS may have the fourth voltage level V4. The second voltage level V2 may be higher than the first voltage level V1, the third voltage level V3 may be higher than the second voltage level V2, and the fourth voltage level V4 may be higher than the third voltage level V3. The Tx signal TS may be retained at the current voltage level or the voltage level thereof may be changed to the other three voltage levels, according to whether the state of the symbol transitions. For example, when the symbol transitions from the second state to the third state, the Tx signal TS may be changed from the second voltage level V2 to the third voltage level V3.

The first semiconductor apparatus 110 may include a signal transmitting device 111 and a signal receiving device 112. The signal transmitting device 111 and the signal receiving device 112 may be coupled to the Tx signal bus 101 through a pad 113. The signal transmitting device 111 may receive an internal signal IS1 of the first semiconductor apparatus 110, and transmit a Tx signal TS, generated based on the internal signal IS1, to the second semiconductor apparatus 120 through the pad 113 and the Tx signal bus 101. The signal receiving device 112 may receive the Tx signal TS transmitted through the Tx signal bus 101 and the pad 113, and generate the internal signal IS1 based on the Tx signal TS. For example, the signal transmitting device 111 may generate the Tx signal TS having one voltage level of the first to fourth voltage levels, according to the state of a symbol which is generated based on the bit stream of the internal signal IS1. The signal transmitting device 111 may be a DAC (Digital-to-Analog Converter) configured to convert the bit stream of the internal signal IS1 as a digital signal into the Tx signal TS as an analog voltage. The signal receiving device 112 may detect the voltage level of the Tx signal TS, and recover the bit stream from the Tx signal TS. The signal receiving device 112 may recover the symbol from the Tx signal TS, and generate the bit stream of the internal signal IS1 based on the symbol. The signal receiving device 112 may be an ADC (Analog-to-Digital Converter) configured to convert the Tx signal TS as an analog voltage into the bit stream as a digital signal.

The second semiconductor apparatus 120 may include a signal transmitting device 121 and a signal receiving device 122. The signal transmitting device 121 and the signal receiving device 122 may be coupled to the Tx signal bus 101 through a pad 123. The signal transmitting device 121 may receive an internal signal IS2 of the second semiconductor apparatus 120, and transmit a Tx signal TS, generated based on the internal signal IS2, to the first semiconductor apparatus 110 through the pad 123 and the Tx signal bus 101. The signal receiving device 122 may receive the Tx signal TS transmitted through the Tx signal bus 101 and the pad 123, and generate the internal signal IS2 based on the Tx signal TS. For example, the signal transmitting device 121 may generate the Tx signal TS having one voltage level of the first to fourth voltage levels, according to the state of a symbol which is generated based on the bit stream of the internal signal IS2. The signal transmitting device 121 may be a DAC configured to convert the bit stream of the internal signal IS2 as a digital signal into the Tx signal TS as an analog voltage. The signal receiving device 122 may detect the voltage level of the Tx signal TS, and recover the bit stream from the Tx signal TS. The signal receiving device 122 may recover the symbol from the Tx signal TS, and generate the bit stream of the internal signal IS2 based on the symbol. The signal receiving device 122 may be an ADC configured to convert the Tx signal TS as an analog voltage into the bit stream as a digital signal.

Figure 2:
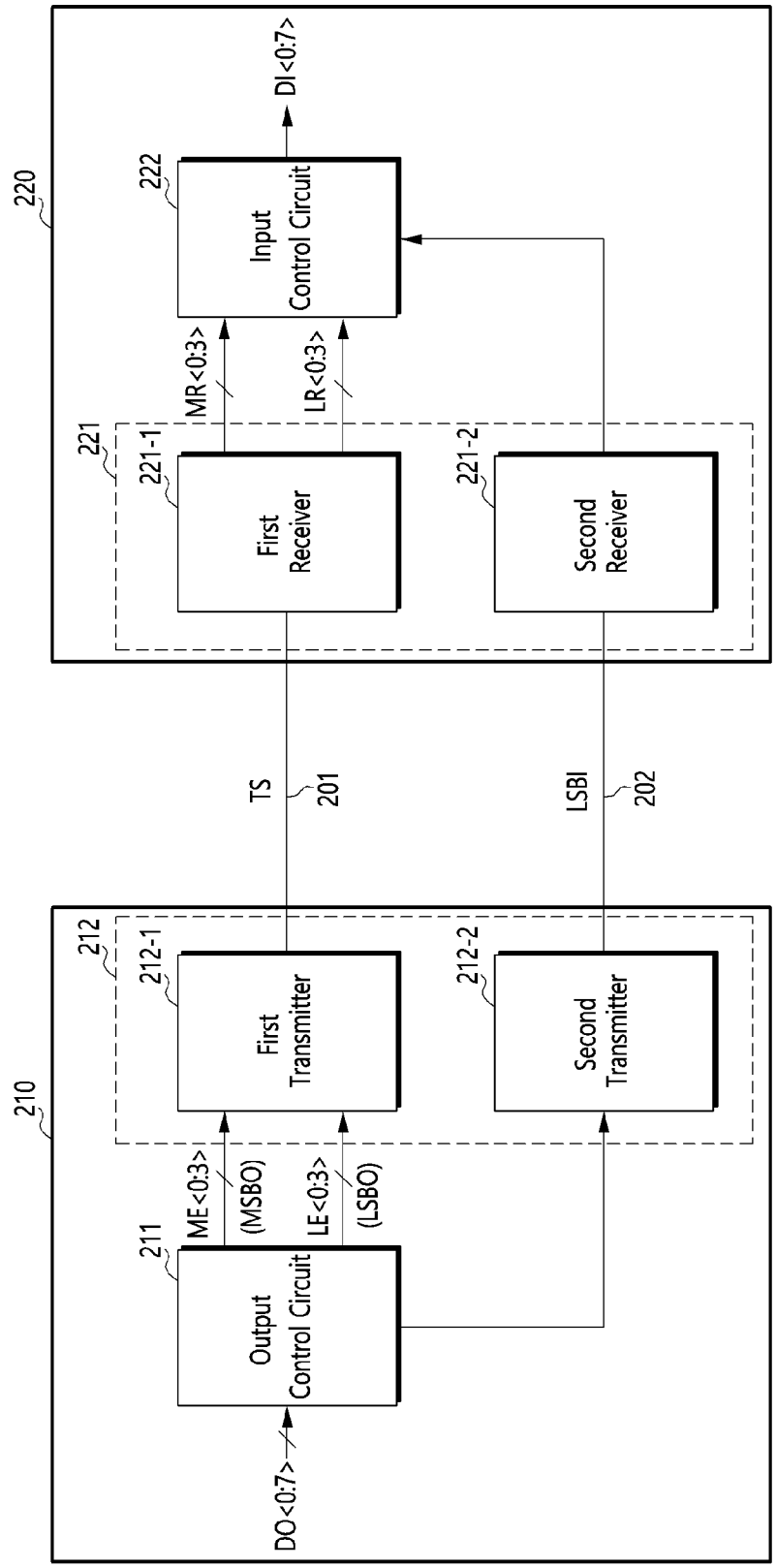
FIG. 2 is a diagram illustrating a configuration of a transmitting and receiving system in accordance with an embodiment.

FIG. 2 is a diagram illustrating a configuration of a transmitting and receiving system 200 in accordance with an embodiment. Referring to FIG. 2, the transmitting and receiving system 200 may include a signal transmitting device 210 and a signal receiving device 220. The signal transmitting device 210 may transmit the Tx signal TS to the signal receiving device 220, and the signal receiving device 220 may receive the Tx signal TS transmitted from the signal transmitting device 210. The signal transmitting device 210 may be installed in a semiconductor apparatus different from a semiconductor apparatus having the signal receiving device 220 installed therein. The signal transmitting device 210 may be applied as each of the signal transmitting devices 111 and 121 illustrated in FIG. 1, and the signal receiving device 220 may be applied as each of the signal receiving devices 112 and 122 illustrated in FIG. 1. In an embodiment, the signal transmitting device 210 may be installed in the same semiconductor apparatus as the signal receiving device 220. The signal transmitting device 210 may generate symbols corresponding to an output data stream DO<0:7>. The symbols may each include two bits. The signal transmitting device 210 may generate the Tx signal TS based on the symbols, and transmit the Tx signal TS to the signal receiving device 220. The Tx signal TS may be a multi-level signal having a plurality of voltage levels as illustrated in FIG. 1. The signal receiving device 220 may receive the Tx signal TS, and recover the symbols from the Tx signal TS. The signal receiving device 220 may generate an input data stream DI<0:7> based on the recovered symbols.

The signal transmitting device 210 may include an output control circuit 211 and a transmitting circuit 212. The output control circuit 211 may receive the output data stream DO<0:7>. The output data stream DO<0:7> may include consecutive data bits. For example, the output data stream DO<0:7> may include 8-bit data, but the number of data bits included in the output data stream DO<0:7> is not limited. The output control circuit 211 may generate a plurality of symbols based on the output data stream DO<0:7>. For example, when the plurality of symbols each include two bits, the output control circuit 211 may generate four symbols from the 8-bit data. The four symbols may each include a first bit and a second bit. The first bit may be the most significant bit, and the second bit may be the least significant bit. The output control circuit 211 may generate four encoded symbols ME<0:3> and LE<0:3> by encoding the four symbols. The output control circuit 211 may provide the four encoded symbols ME<0:3> and LE<0:3> as a first output control signal MSBO and a second output control signal LSBO. The output control circuit may sequentially provide the first bits ME<0:3> of the four encoded symbols as the first output control signal MSBO, and sequentially provide the second bits LE<0:3> of the four encoded symbols as the second output control signal LSBO.

The output control circuit 211 may invert the logic levels of the second bits of the four symbols, when the maximum transition is present among the four symbols. Furthermore, the output control circuit 211 may generate an inverted flag signal LSBI, when inverting the logic levels of the second bits of the four symbols. When the maximum transition is present among the symbols, it may indicate that at least two symbols adjacent to each other are changed from one boundary state to another boundary state. Referring to FIG. 2 with FIG. 1, the maximum transition may occur when the current symbol has the first state and the next symbol has the fourth state. Alternatively, when the current symbol has the fourth state and the next symbol has the first state, the maximum transition may occur. When the maximum transition is present among the symbols, the Tx signal TS which is generated based on the symbols may need to rise or fall from one boundary voltage level to the opposite boundary voltage level. When the maximum transition is present among the symbols, the Tx signal TS may rise from the first voltage level to the fourth voltage level or fall from the fourth voltage level to the first voltage level. When the maximum transition is present while the signal transmitting device 210 operates in a high-speed and low-power environment, the Tx signal TS might not sufficiently reach a target voltage level within a predetermined time. When the Tx signal TS does not sufficiently reach the target voltage level, the valid window of the Tx signal TS may be reduced, and the signal receiving device 220 might not accurately receive the Tx signal TS. When the maximum transition is present among the four symbols, the output control circuit 211 may encode the four symbols and generate the Tx signal TS based on the encoded symbols, thereby preventing the voltage level of the Tx signal TS from changing to the maximum or full swinging. The word "predetermined" as used herein with respect to a parameter, such as a predetermined time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Although the logic levels of the second bits of the four symbols are inverted because the maximum transition is present among the four symbols, the maximum transition may also be present among the four symbols including the inverted second bits. When the maximum transition is present even after the logic levels of the second bits are inverted, the output control circuit 211 may re-invert the logic levels of the second bits of edge symbols, thereby generating the four encoded symbols ME<0:3> and LE<0:3>. The edge symbols may indicate symbols located at edges among the four symbols. For example, when the four symbols sequentially include first to fourth symbols, the edge symbols may indicate the first and fourth symbols.

The transmitting circuit 212 may generate the Tx signal TS based on the first and second output control signals MSBO and LSBO, and transmit the Tx signal TS to the signal receiving device 220 through a first signal transmitting line 201. The transmitting circuit 212 may transmit the inverted flag signal LSBI to the signal receiving device 220 through a second signal transmitting line 202. The transmitting circuit 212 may include a first transmitter 212-1 and a second transmitter 212-2. The first transmitter 212-1 may receive the first and second output control signals MSBO and LSBO from the output control circuit 211, and drive the first signal transmitting line 201 based on the first and second output control signals MSBO and LSBO, in order to transmit the Tx signal TS. The second transmitter 212-2 may receive the inverted flag signal LSBI from the output control circuit 211, and transmit the inverted flag signal LSBI through the second signal transmitting line 202.

The signal receiving device 220 may include a receiving circuit 221 and an input control circuit 222. The receiving circuit 221 may be coupled to the first and second signal transmitting lines 201 and 202, and receive the Tx signal TS and the inverted flag signal LSBI, transmitted through the first and second signal transmitting lines 201 and 202, respectively. The receiving circuit 221 may detect the voltage level of the Tx signal TS, and generate Rx (Receive) symbols MR<0:3> and LR<0:3>. For example, the receiving circuit 221 may sequentially receive four Tx signals TS, and generate four Rx symbols MR<0:3> and LR<0:3>. The receiving circuit 221 may receive the inverted flag signal LSBI, and provide the inverted flag signal LSBI to the input control circuit 222. In an embodiment, the receiving circuit 221 may include a first receiver 221-1 and a second receiver 221-2.

The input control circuit 222 may receive the four Rx symbols MR<0:3> and LR<0:3> and the inverted flag signal LSBI from the receiving circuit 221. The input control circuit 222 may recover the four symbols generated through the output control circuit 211, based on the Rx symbols MR<0:3> and LR<0:3> and the inverted flag signal LSBI. The input control circuit 222 may generate four decoded symbols by decoding the four Rx symbols MR<0:3> and LR<0:3>. The input control circuit 222 may generate an input data stream DI<0:7> based on the four decoded symbols. The input control circuit 222 may generate the decoded symbols by inverting the logic levels of the second bits of the four Rx symbols MR<0:3> and LR<0:3> based on the inverted flag signal LSBI. When the maximum transition is not present among the four Rx symbols MR<0:3> and LR<0:3> after the logic levels of the second bits of the four Rx symbols are inverted, the input control circuit 222 may re-invert the logic levels of the second bits of the edge symbols among the four Rx symbols MR<0:3> and LR<0:3>. The operation of the input control circuit 222 to invert the logic levels of the second bits of the four Rx symbols MR<0:3> and LR<0:3> based on the inverted flag signal LSBI may indicate an operation of decoding the logic levels of the second bits of the four symbols, which have been inverted by the output control circuit 211. The operation of the input control circuit 222 to re-invert the logic levels of the second bits of the edge symbols after inverting the logic levels of the second bits of the four Rx symbols MR<0:3> and LR<0:3> may indicate an operation of decoding the logic levels of the second bits of the edge symbols, which have been re-inverted by the output control circuit 211 after the logic levels of the second bits of the four symbols were inverted. Therefore, the input control circuit 222 may operate complementarily with the output control circuit 211, and generate decoded symbols having the same values as the symbols which are generated based on the output data stream DO<<0:7>. The input control circuit 222 may generate the input data stream DI<0:7> based on the four decoded symbols. The input data stream DI<0:7> may have substantially the same logic value as the output data stream DO<0:7>.

Figure 3:
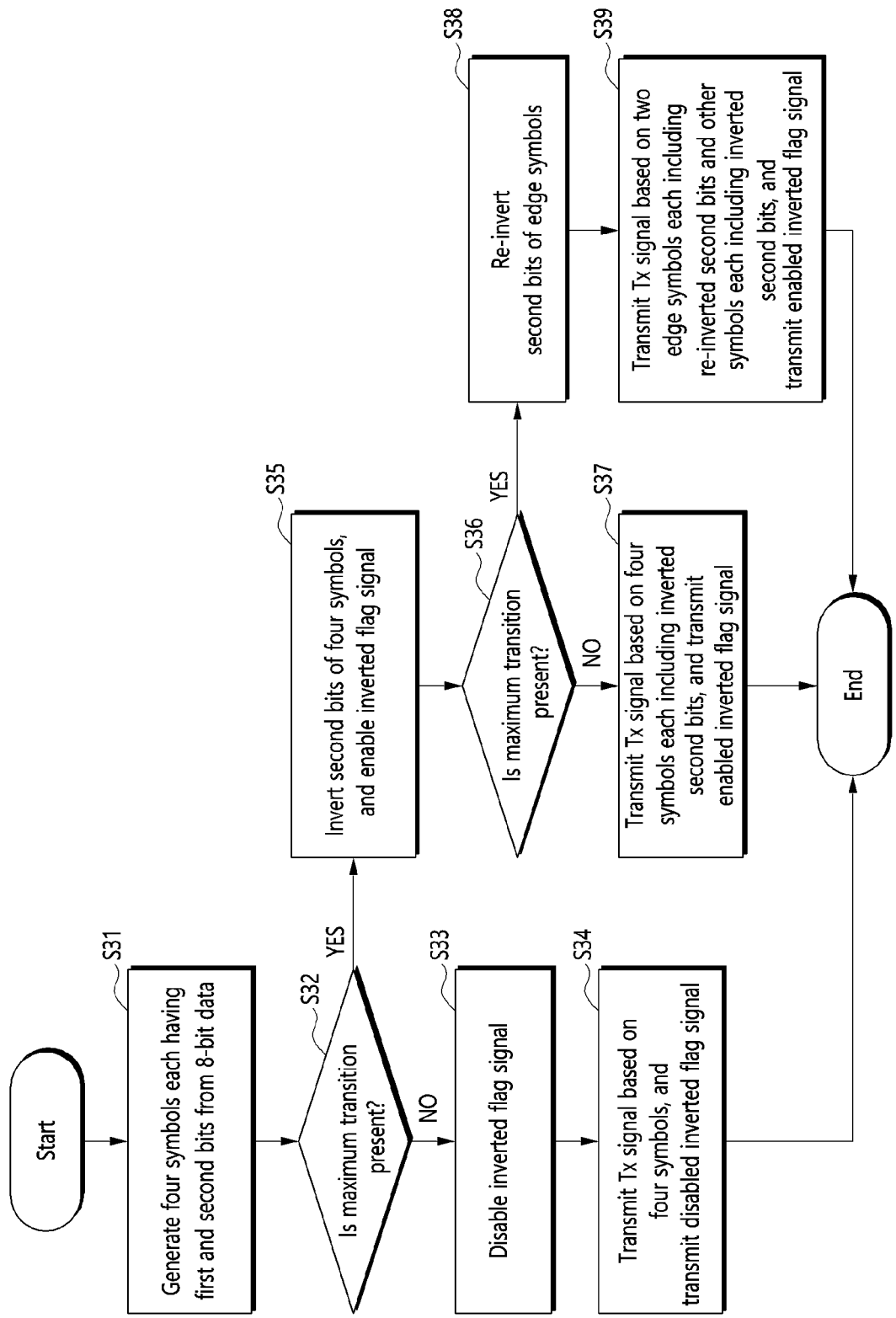
FIG. 3 is a flowchart illustrating an operation of a signal transmitting device in accordance with an embodiment.

FIG. 3 is a flowchart illustrating the operation of the signal transmitting device 210 illustrated in FIG. 2. Referring to FIGS. 2 and 3, the signal transmitting device 210 in accordance with a present embodiment may operate as follows. The signal transmitting device 210 may encode symbols for generating the Tx signal TS, in order to prevent the voltage level of the Tx signal TS, transmitted through the first signal transmitting line 201, from changing to the maximum or full swinging. In step S31, the output control circuit 211 may generate four symbols from an output data stream DO<0:7> including eight bits. The four symbols may each include a first bit and a second bit. In step S32, the output control circuit 211 may determine whether the maximum transition is present among the four symbols. When the determination result indicates that the maximum transition is not present (No in step S32), the output control circuit 211 may disable the inverted flag signal LSBI, and provide four symbols generated from the output data stream DO<0:7> as the four encoded symbols ME<0:2> and LE<0:3>, in step S33. In step S34, the transmitting circuit 212 might not only sequentially transmit four Tx signals TS through the first signal transmitting line 201 based on the four encoded symbols ME<0:3> and LE<0:3> having the same values as the four symbols, but also transmit the disabled inverted flag signal LSBI through the second signal transmitting line 202.

When the determination result of step S32 indicates that the maximum transition is present (Yes in step S32), the output control circuit 211 may enable the inverted flag signal LSBI, and invert the logic levels of the second bits of the four symbols, in step S35. In step S36, the output control circuit 211 may redetermine whether the maximum transition is present among the four symbols including the inverted second bits, after the logic levels of the second bits of the four symbols are inverted. When the redetermination result indicates that the maximum transition is not present (No in step S36), the output control circuit 211 may provide the four symbols including the inverted second bits as the four encoded symbols ME<0:3> and LE<0:3> in step S37. The transmitting circuit 212 might not only sequentially transmit the four Tx signals TS through the first signal transmitting line 201 based on the four symbols including the inverted second bits, but also transmit the enabled inverted flag signal LSBI through the second signal transmitting line 202.

When the determination result of step S36 indicates that the maximum transition is present (Yes in step S36), the output control circuit 211 may re-invert the logic levels of the second bits of the edge symbols among the four symbols in step S38. Therefore, the edge symbols among the four symbols may have the same values as the corresponding symbols generated from the output data stream DO<0:7>. Since the logic levels of the second bits of the other symbols which are not the edge symbols among the four symbols are inverted, the other symbols may have different values from those of the corresponding symbols generated from the output data stream DO<0:7>. The output control circuit 222 may generate, as the four encoded symbols ME<0:3> and LE<0:3>, the two edge symbols each including the re-inverted second bit and the other two symbols each including the inverted second bit. The transmitting circuit 212 might not only sequentially transmit the four Tx signals TS through the first signal transmitting line 201 based on the four encoded symbols ME<0:3> and LE<0:3>, but also transmit the enabled inverted flag signal LSBI through the second signal transmitting line 202.

Figure 4:
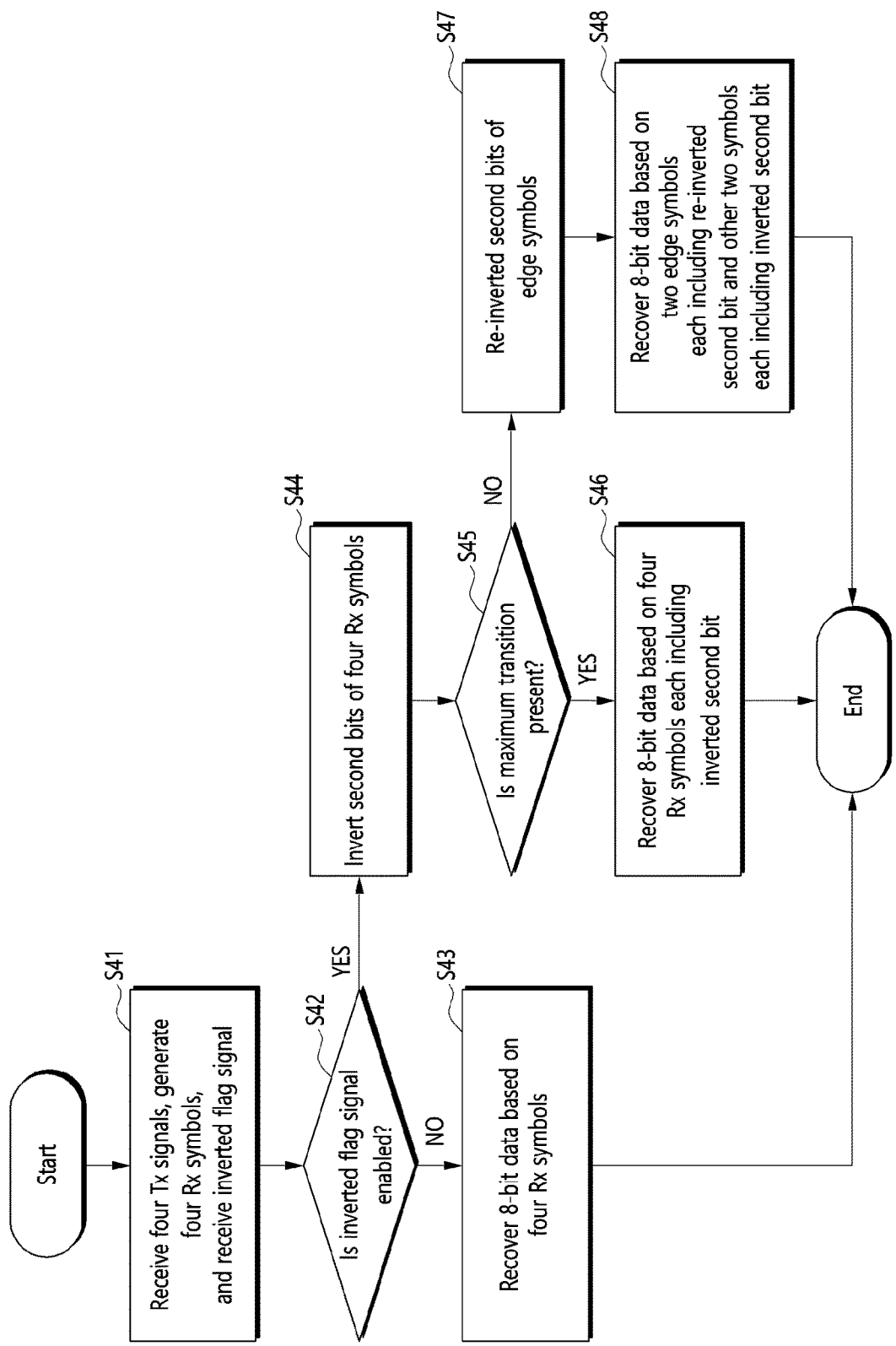
FIG. 4 is a flowchart illustrating an operation of a signal receiving device in accordance with an embodiment.

FIG. 4 is a flowchart illustrating the operation of the signal receiving device 220 illustrated in FIG. 2. Referring to FIGS. 2 to 4, the signal receiving device 220 in accordance with the present embodiment may operate as follows. The signal receiving device 220 may decode the symbols generated from the Tx signals TS complementarily with the encoding method of the signal transmitting device 210, in order to an input data stream DI<0:7> having the same logic value as the output data stream DO<0:7>. In step S41, the receiving circuit 221 may sequentially receive four Tx signals TS transmitted from the signal transmitting device 210 through the first signal transmitting line 201. The receiving circuit 221 may receive the inverted flag signal LSBI transmitted from the signal transmitting device 210 through the second signal transmitting line 202. The receiving circuit 221 may generate a plurality of voltage detection signals by comparing the Tx signals TS to a plurality of reference voltages. The receiving circuit 221 may generate four Rx symbols MR<0:3> and LR<0:3> based on the plurality of voltage detection signals.

In step S42, the receiving circuit 221 may determine whether the inverted flag signal LSBI is enabled. When the determination result indicates that the inverted flag signal LSBI is disabled (No in step S42), the input control circuit 222 may provide the four Rx symbols MR<0:3> and LR<0:3> as four decoded symbols in step S43. The input control circuit 222 may recover the 8-bit input data stream DI<0:7> based on the four Rx symbols.

When the determination result of step S42 indicates that the inverted flag signal is enabled (Yes in step S42), the input control circuit 222 may invert the logic levels of the second bits of the four Rx symbols in step S44. In step S45, the input control circuit 222 may determine whether the maximum transition is present among the four Rx symbols including the inverted second bits. When the determination result indicates that the maximum transition is present (Yes in step S45), the input control circuit 222 may determine that the second bits of the edge symbols were not re-inverted by the output control circuit 211. In step S46, the input control circuit 222 may provide the four Rx symbols including the inverted second bits as the four decoded symbols. The input control circuit 222 may recover the 8-bit input data stream DI<0:7> based on the four Rx symbols including the inverted second bits.

When the determination result of step S45 indicates that the maximum transition is not present (No in step S45), the input control circuit 222 may determine that the second bits of the edge symbols were re-inverted by the output control circuit 211. In step S47, the input control circuit 222 may re-invert the logic levels of the second bits of the edge symbols among the four Rx symbols. Therefore, the edge symbols among the four Rx symbols may have the same values as those of the corresponding Rx symbols generated from the Tx signal TS. Since the logic levels of the second bits of the other Rx symbols which are not the edge symbols are inverted, the other Rx symbols may have different values from those of the corresponding Rx symbols generated from the Tx signal TS. The input control circuit 222 may provide, as the four decoded symbols, the two edge symbols each including the re-inverted second bit and the other two symbols each including the inverted second bit. The input control circuit 222 may recover the 8-bit input data stream DI<0:7> from the four decoded symbols.

Figure 5:
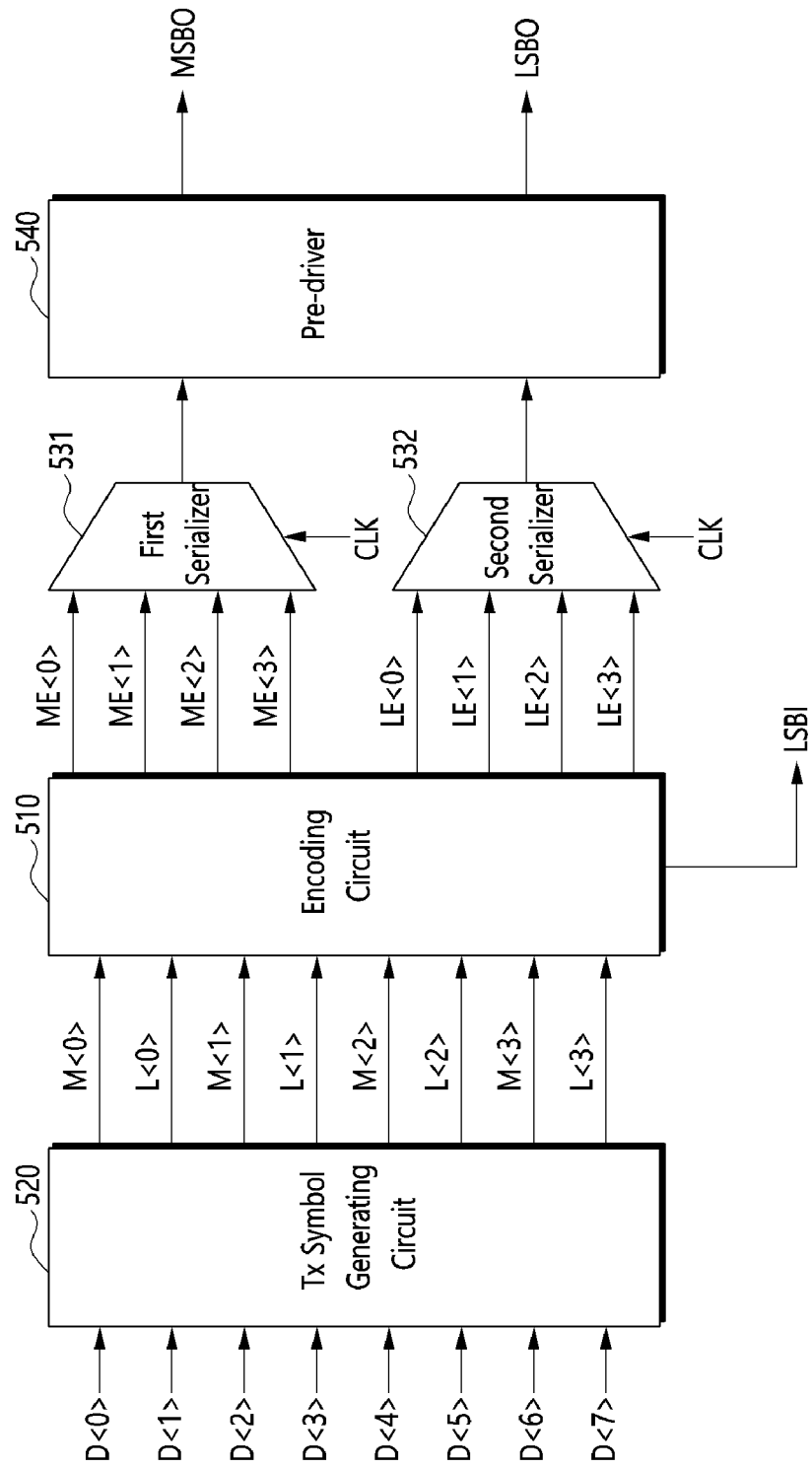
FIG. 5 is a diagram illustrating a configuration of an output control circuit illustrated in FIG. 2.

FIG. 5 is a block diagram illustrating the configuration of the output control circuit 211 illustrated in FIG. 2. Referring to FIG. 5, the output control circuit 211 may include an encoding circuit 510. The encoding circuit 510 may receive first to fourth symbols M<0:3> and L<0:3>, and generate first to fourth encoded symbols ME<0:3> and LE<0:3> by encoding the first to fourth symbols M<0:3> and L<0:3> according to whether the maximum transition is present among the first to fourth symbols M<0:3> and L<0:3>. The first to fourth symbols M<0:3> and L<0:3> may each include a first bit and a second bit. The first to fourth symbols M<0:3> and L<0:3> may be generated based on the output data stream DO<0:7>. The output control circuit 211 may further include a Tx symbol generating circuit 520 to generate the first to fourth symbols M<0:3> and L<0:3> based on the output data stream DO<0:7>. The Tx symbol generating circuit 520 may generate the first to fourth symbols M<0:3> and L<0:3> from the 8-bit output data stream DO<0:7>. The Tx symbol generating circuit 520 may provide a first bit DO<0> of the output data stream as a first bit M<0> of the first symbol, and provide a second bit DO<1> of the output data stream as a second bit L<0> of the first symbol. The Tx symbol generating circuit 520 may provide a third bit DO<2> of the output data stream as a first bit M<1> of the second symbol, and provide a fourth bit DO<3> of the output data stream as a second bit L<1> of the second symbol. The Tx symbol generating circuit 520 may provide a fifth bit DO<4> of the output data stream as a first bit M<2> of the third symbol, and provide a sixth bit DO<5> of the output data stream as a second bit L<2> of the third symbol. The Tx symbol generating circuit 520 may provide a seventh bit DO<6> of the output data stream as a first bit M<3> of the fourth symbol, and provide an eighth bit DO<7> of the output data stream as a second bit L<3> of the fourth symbol.

The encoding circuit 510 may detect whether the maximum transition is present among the first to fourth symbols M<0:3> and L<0:3>, and invert the logic levels of the second bits L<0:3> of the first to fourth symbols according to whether the maximum transition is present. When the maximum transition is not present, the encoding circuit 510 might not invert the logic levels of the second bits L<0:3> of the first to fourth symbols, but provide the first to fourth symbols M<0:3> and L<0:3> as the first to fourth encoded symbols ME<0:3> and LE<0:3>. When the maximum transition is present, the encoding circuit 510 may enable the inverted flag signal LSBI, and invert the logic levels of the second bits L<0:3> of the first to fourth symbols. For example, the encoding circuit 510 may enable the inverted flag signal LSBI to a high logic level. The encoding circuit 510 may invert the logic levels of the second bits L<0:3> of the first to fourth symbols, and then redetermine whether the maximum transition is present among the first to fourth symbols including the inverted second bits. When the maximum transition is not present, the encoding circuit 510 may provide the first to fourth symbols including the inverted second bits as the first to fourth encoded symbols ME<0:3> and LE<0:3>. When the maximum transition is present, the encoding circuit 510 may re-invert the second bits L<0> and L<3> of the first and fourth symbols corresponding to the edge symbols among the first to fourth symbols. Therefore, the first and fourth encoded symbols ME<0>, LE<0>, ME<3> and LE<3> may have the same values as the first and fourth symbols M<0>, L<0>, M<3> and L<3> generated from the output data stream DO<0:7>. The second and third encoded symbols ME<1>, LE<1>, ME<2> and LE<2> may have the same values as those of the second and third symbols having the second bits whose logic levels are inverted.

The output control circuit 211 may further include a first serializer 531 and a second serializer 532. The first serializer 531 may receive the first bits ME<0:3> of the first to fourth encoded symbols, and sequentially output the first bits ME<0:3> of the first to fourth encoded symbols as the first output control signal MSBO. The first serializer 531 may further receive a clock signal CLK, and sequentially output the first bits ME<0:3> of the first to fourth encoded symbols as the first output control signal MSBO in synchronization with the clock signal CLK. For example, the first serializer 531 may output the first bit ME<0> of the first encoded symbol as the first output control signal in synchronization with a first edge of the clock signal CLK, and output the first bit ME<1> of the second encoded symbol as the first output control signal MSBO in synchronization with a second edge of the clock signal CLK. The first serializer 531 may output the first bit ME<2> of the third encoded symbol as the first output control signal MSBO in synchronization with a third edge of the clock signal CLK, and output the first bit ME<3> of the fourth encoded symbol as the first output control signal MSBO in synchronization with a fourth edge of the clock signal CLK.

The second serializer 532 may receive the second bits LE<0:3> of the first to fourth encoded symbols, and sequentially output the second bits LE<0:3> of the first to fourth encoded symbols as the second output control signal LSBO. The second serializer 532 may further receive the clock signal CLK, and sequentially output the second bits LE<0:3> of the first to fourth encoded symbols as the second output control signal LSBO in synchronization with the clock signal CLK. For example, the second serializer 532 may output the second bit LE<0> of the first encoded symbol as the second output control signal LSBO in synchronization with the first edge of the clock signal CLK, and output the second bit LE<1> of the second encoded symbol as the second output control signal LSBO in synchronization with the second edge of the clock signal CLK. The second serializer 532 may output the second bit LE<2> of the third encoded symbol as the second output control signal LSBO in synchronization with the third edge of the clock signal CLK, and output the second bit LE<3> of the fourth encoded symbol as the second output control signal LSBO in synchronization with the fourth edge of the clock signal CLK.

The output control circuit 211 may further include a pre-driver 540. The pre-driver 540 may be coupled to the first and second serializers 531 and 532. The pre-driver 540 may generate the first output control signal MSBO by delaying and driving an output of the first serializer 531. The pre-driver 540 may generate the second output control signal LSBO by delaying and driving an output of the second serializer 532.

Figure 6:
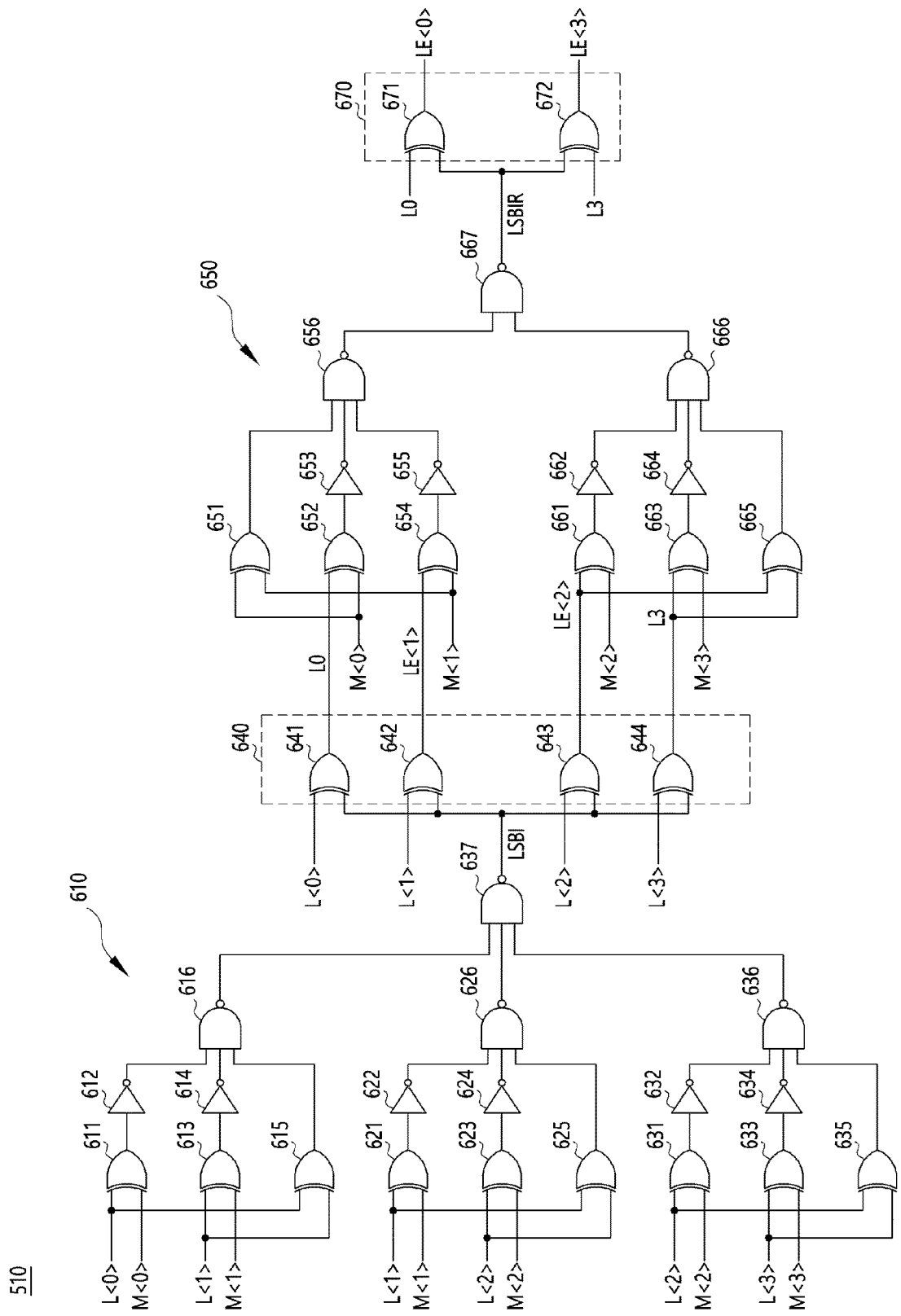
FIG. 6 is a diagram illustrating a configuration of an encoding circuit illustrated in FIG. 5.

FIG. 6 is a diagram illustrating the configuration of the encoding circuit illustrated in FIG. 5. Referring to FIG. 6, the encoding circuit 510 may include a first detection circuit 610, a bit inverting circuit 640, a second detection circuit 650 and a bit re-inverting circuit 670. The first detection circuit 610 may generate the inverted flag signal LSBI by detecting whether the maximum transition is present among the first to fourth symbols M<0:3> and L<0:3>. The first detection circuit 610 may generate the inverted flag signal LSBI by detecting the logic levels of the first bits M<0:3> and the second bits L<0:3> of the first to fourth symbols. The first detection circuit 610 may compare the logic levels of the first and second bits M<0:3> and L<0:3> of the first to fourth symbols, and compare the logic levels of the first and second bits of adjacent two symbols. The first detection circuit 610 may enable the inverted flag signal LSBI based on the comparison results. The bit inverting circuit 640 may receive the inverted flag signal LSBI and the second bits L<0:3> of the first to fourth symbols. The bit inverting circuit 640 may invert the logic levels of the second bits L<0:3> of the first to fourth symbols based on the inverted flag signal LSBI. For example, the bit inverting circuit 640 may invert the logic levels of the second bits L<0:3> of the first to fourth symbols when the inverted flag signal LSBI is enabled to a high logic level. When the inverted flag signal LSBI is disabled to a low logic level, the bit inverting circuit 640 might not invert the logic levels of the second bits L<0:3> of the first to fourth symbols, but retain the logic levels of the second bits L<0:3> of the first to fourth symbols.

The second detection circuit 650 may be coupled to the bit inverting circuit 640, and receive the inverted second bits output from the bit inverting circuit 640. The second detection circuit may receive the first bits M<0:3> of the first to fourth symbols. The second detection circuit 650 may detect the logic levels of the first bits M<0:3> and the inverted second bits of the first to fourth symbols, and generate a re-inverted flag signal LSBIR according to whether the maximum transition is present. The second detection circuit 650 may compare the first bits M<0:3> of the first to fourth symbols to the inverted second bits. The second detection circuit 650 may compare the logic levels of the first bits M<0:3> and the inverted second bits of the first and second symbols. The second detection circuit 650 may enable the re-inverted flag signal LSBIR based on the comparison results. The bit re-inverting circuit 670 may receive the re-inverted flag signal LSBIR and the inverted second bits of the first and fourth symbols. The bit re-inverting circuit 670 may re-invert the inverted logic levels of the second bits of the first and fourth symbols based on the re-inverted flag signal LSBIR. For example, the bit re-inverting circuit 670 may re-invert the inverted logic levels of the second bits of the first and fourth symbols, when the re-inverted flag signal LSBIR is enabled to a high logic level. When the re-inverted flag signal LSBIR is disabled to a low logic level, the bit re-inverting circuit 670 might not re-invert the inverted logic levels of the second bits of the first and fourth symbols, but retain the inverted logic levels of the second bits of the first and fourth symbols.

The first bits M<0:3> of the first to fourth symbols may be provided as the first bits ME<0:3> of the first to fourth encoded symbols, respectively. The first bit M<0> of the first symbol may be provided as the first bit ME<1> of the first encoded symbol, the first bit M<1> of the second symbol may be provided as the first bit ME<1> of the second encoded symbol, the first bit M<2> of the third symbol may be provided as the first bit ME<2> of the third encoded symbol, and the first bit M<3> of the fourth symbol may be provided as the first bit ME<3> of the fourth encoded symbol. The inverted second bits of the second and third symbols output from the bit inverting circuit 640 may be provided as the second bits LE<1> and LE<2> of the second and third encoded symbols, respectively. The inverted second bit of the second symbol may be provided as the second bit LE<1> of the second encoded symbol, and the inverted second bit of the third symbol may be provided as the second bit LE<2> of the third encoded symbol. The re-inverted second bits of the first and fourth symbols output from the bit re-inverting circuit 670 may be provided as the second bits LE<0> and LE<3> of the first and fourth encoded symbols, respectively. The re-inverted second bits of the first symbol may be provided as the second bit LE<0> of the first encoded symbol, and the re-inverted second bits of the fourth symbol may be provided as the second bit LE<3> of the fourth encoded symbol.

The first detection circuit 610 may include a first XOR gate 611, a first inverter 612, a second XOR gate 613, a second inverter 614, a third XOR gate 615, a first NAND gate 616, a fourth XOR gate 621, a third inverter 622, a fifth XOR gate 623, a fourth inverter 624, a sixth XOR gate 625, a second NAND gate 626, a seventh XOR gate 631, a fifth inverter 632, an eighth XOR gate 633, a sixth inverter 634, a ninth XOR gate 635, a third NAND gate 636 and a fourth NAND gate 637. The first XOR gate 611 may receive the first and second bits M<0> and L<0> of the first symbol, and compare the logic levels of the first and second bits M<0> and L<0> of the first symbol. The first inverter 612 may invert the logic level of an output of the first XOR gate 611. The second XOR gate 613 may receive the first and second bits M<1> and L<1> of the second symbol, and compare the logic levels of the first and second bits M<1> and L<1> of the second symbol. The second inverter 614 may invert the logic level of an output of the second XOR gate 613. The third XOR gate 615 may receive the second bit L<0> of the first symbol and the second bit L<1> of the second symbol, and compare the logic levels of the second bit L<0> of the first symbol and the second bit L<1> of the second symbol. The first NAND gate 616 may perform a NAND operation on outputs of the first inverter 612, the second inverter 614 and the third XOR gate 615.

The fourth XOR gate 621 may receive the first and second bits M<1> and L<1> of the second symbol, and compare the logic levels of the first and second bits M<1> and L<1> of the second symbol. The third inverter 622 may invert the logic level of an output of the fourth XOR gate 621. The fifth XOR gate 623 may receive the first and second bits M<2> and L<2> of the third symbol, and compare the logic levels of the first and second bits M<2> and L<2> of the third symbol. The fourth inverter 624 may invert the logic level of an output of the fifth XOR gate 623. The sixth XOR gate 624 may receive the second bit L<1> of the second symbol and the second bit L<2> of the third symbol, and compare the logic levels of the second bit L<1> of the second symbol and the second bit L<2> of the third symbol. The second NAND gate 626 may perform a NAND operation on outputs of the third inverter 622, the fourth inverter 624 and the sixth XOR gate 625.

The seventh XOR gate 631 may receive the first and second bits M<2> and L<2> of the third symbol, and compare the logic levels of the first and second bits M<2> and L<2> of the third symbol. The fifth inverter 632 may invert the logic level of an output of the seventh XOR gate 631. The eighth XOR gate 633 may receive the first and second bits M<3> and L<3> of the fourth symbol, and compare the logic levels of the first and second bits M<3> and L<3> of the fourth symbol. The sixth inverter 634 may invert the logic level of an output of the eighth XOR gate 633. The ninth XOR gate 635 may receive the second bit L<2> of the third symbol and the second bit L<3> of the fourth symbol, and compare the logic levels of the second bit L<2> of the third symbol and the second bit L<3> of the fourth symbol. The third NAND gate 636 may perform a NAND operation on outputs of the fifth inverter 632, the sixth inverter 634 and the ninth XOR gate 635. The fourth NAND gate 637 may receive the outputs of the first to third NAND gates 616, 626 and 636, and generate the inverted flag signal LSBI by performing a NAND operation on the outputs of the first to third NAND gates 616, 626 and 636.

The bit inverting circuit 640 may include a first XOR gate 641, a second XOR gate 642, a third XOR gate 643 and a fourth XOR gate 644. The first XOR gate 641 may receive the second bit L<0> of the first symbol and the inverted flag signal LSBI. The first XOR gate 641 may invert the logic level of the second bit L<0> of the first symbol when the inverted flag signal LSBI is at a high logic level, and retain the logic level of the second bit L<0> of the first symbol when the inverted flag signal LSBI is at a low logic level. The second XOR gate 642 may receive the second bit L<1> of the second symbol and the inverted flag signal LSBI. The second XOR gate 642 may invert the logic level of the second bit L<1> of the second symbol when the inverted flag signal LSBI is at a high logic level, and retain the logic level of the second bit L<1> of the second symbol when the inverted flag signal LSBI is at a low logic level. The third XOR gate 643 may receive the second bit L<2> of the third symbol and the inverted flag signal LSBI. The third XOR gate 643 may invert the logic level of the second bit L<2> of the third symbol when the inverted flag signal LSBI is at a high logic level, and retain the logic level of the second bit L<2> of the third symbol when the inverted flag signal LSBI is at a low logic level. The fourth XOR gate 644 may receive the second bit L<3> of the fourth symbol and the inverted flag signal LSBI. The fourth XOR gate 644 may invert the logic level of the second bit L<3> of the fourth symbol when the inverted flag signal LSBI is at a high logic level, and retain the logic level of the second bit L<3> of the fourth symbol when the inverted flag signal LSBI is at a low logic level. The output of the second XOR gate 642 may be provided as the second bit LE<1> of the second encoded symbol, and the output of the third XOR gate 643 may be provided as the second bit LE<2> of the third encoded symbol.

The second detection circuit 650 may include a first XOR gate 651, a second XOR gate 652, a first inverter 653, a third XOR gate 654, a second inverter 655, a first NAND gate 656, a fourth XOR gate 661, a third inverter 662, a fifth XOR gate 663, a fourth inverter 664, a sixth XOR gate 665, a second NAND gate 666 and a third NAND gate 667. The first XOR gate 651 may receive the first bit M<0> of the first symbol and the first bit M<1> of the second symbol, and compare the logic levels of the first bit M<0> of the first symbol and the first bit M<1> of the second symbol. The second XOR gate 652 may receive an output L0 of the first XOR gate 641 of the bit inverting circuit 640 and the first bit M<0> of the first symbol, and compare the logic levels of the output L0 of the first XOR gate 641 and the first bit M<0> of the first symbol. The first inverter 653 may invert the logic level of an output of the second XOR gate 652. The third XOR gate 654 may receive the output LE<1> of the second XOR gate 642 of the bit inverting circuit 640 and the first bit M<1> of the second symbol, and compare the logic levels of the output LE<1> of the second XOR gate 642 and the first bit M<1> of the second symbol. The second inverter 655 may invert the logic level of an output of the third XOR gate 654. The first NAND gate 656 may receive outputs of the first XOR gate 651, the first inverter 653 and the second inverter 655, and perform a NAND operation on the outputs of the first XOR gate 651, the first inverter 653 and the second inverter 655.

The fourth XOR gate 661 may receive an output LE<2> of the third XOR gate 643 of the bit inverting circuit 640 and the first bit M<2> of the third symbol, and compare the logic levels of the output LE<2> of the third XOR gate 643 and the first bit M<2> of the third symbol. The third inverter 662 may invert the logic level of an output of the fourth XOR gate 661. The fifth XOR gate 663 may receive an output L3 of the fourth XOR gate 644 of the bit inverting circuit 640 and the first bit M<3> of the fourth symbol, and compare the logic levels of the output L3 of the fourth XOR gate 644 and the first bit M<3> of the fourth symbol. The fourth inverter 664 may invert the logic level of an output of the fifth XOR gate 663. The sixth XOR gate 665 may receive the first bit M<2> of the third symbol and the first bit M<3> of the fourth symbol, and compare the logic levels of the first bit M<2> of the third symbol and the first bit M<3> of the fourth symbol. The second NAND gate 666 may receive outputs of the third inverter 662, the fourth inverter 664 and the sixth XOR gate 665, and perform a NAND operation on the outputs of the third inverter 662, the fourth inverter 664 and the sixth XOR gate 665. The third NAND gate 667 may receive outputs of the first NAND gate 656 and the second NAND gate 666, and generate the re-inverted flag signal LSBIR by performing a NAND operation on the outputs of the first NAND gate 656 and the second NAND gate 666.

The bit re-inverting circuit 670 may include a first XOR gate 671 and a second XOR gate 672. The first XOR gate 671 may receive the output L0 of the first XOR gate 641 of the bit inverting circuit 640 and the re-inverted flag signal LSBIR. The first XOR gate 671 may invert the logic level of the output L0 of the first XOR gate 641 of the bit inverting circuit 640 when the re-inverted flag signal LSBIR is at a high logic level, and retain the logic level of the output L0 of the first XOR gate 641 of the bit inverting circuit 640 when the re-inverted flag signal LSBIR is at a low logic level. The second XOR gate 672 may receive the output L3 of the fourth XOR gate 644 of the bit inverting circuit 640 and the re-inverted flag signal LSBIR. The second XOR gate 671 may invert the logic level of the output L3 of the fourth XOR gate 644 of the bit inverting circuit 640 when the re-inverted flag signal LSBIR is at a high logic level, and retain the logic level of the output L3 of the fourth XOR gate 644 of the bit inverting circuit 640 when the re-inverted flag signal LSBIR is at a low logic level. The output of the first XOR gate 671 may be provided as the second bit LE<0> of the first encoded symbol, and the output of the second XOR gate 672 may be provided as the second bit LE<3> of the fourth encoded symbol.

Figure 7:
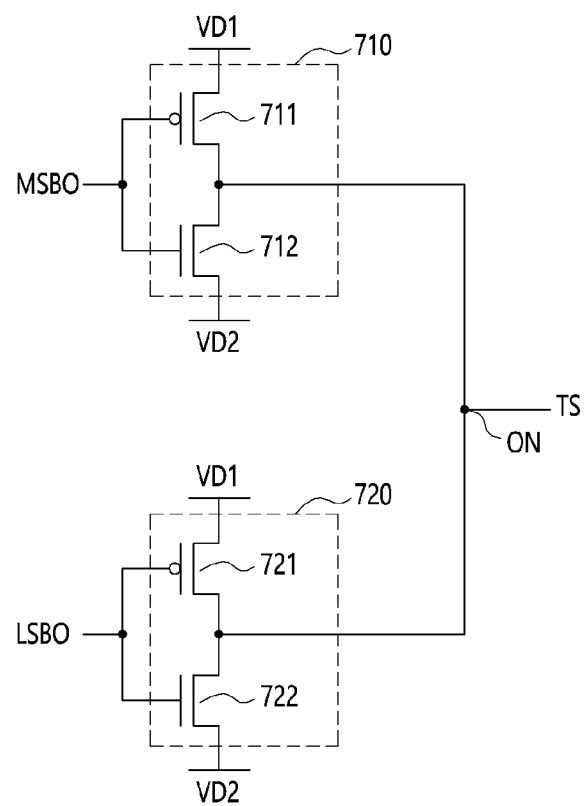
FIG. 7 is a diagram illustrating a configuration of a first transmitter illustrated in FIG. 5.

FIG. 7 is a diagram illustrating the configuration of the first transmitter 212-1 illustrated in FIG. 2. Referring to FIG. 7, the first transmitter 212-1 may include a first output driver 710 and a second output driver 720. The first output driver 710 may receive the first output control signal MSBO, and pull up or down an output node ON based on the first output control signal MSBO. The Tx signal TS may be output through the output node ON. The first output driver 710 may receive a first supply voltage VD1 and a second supply voltage VD2. The second supply voltage VD2 may have a lower voltage level than the first supply voltage VD1. The first output driver 710 may pull up the output node ON to the first supply voltage VD1 or pull down the output node ON to the second supply voltage VD2, based on the first output control signal MSBO. The second output driver 720 may receive the second output control signal LSBO, and pull up or down the output node ON based on the second output control signal LSBO. The second output driver 720 may receive the first supply voltage VD1 and the second supply voltage VD2. The second output driver 720 may pull up the output node ON to the first supply voltage VD1 or pull down the output node ON to the second supply voltage VD2, based on the second output control signal LSBO. The driving force of the first output driver 710 to pull up or down the output node ON may be larger than that of the second output driver 720 to pull up or down the output node ON.

The first output driver 710 may include a first transistor 711 and a second transistor 712. The first transistor 711 may be a P-channel MOS transistor, and the second transistor 712 may be an N-channel MOS transistor. The first transistor 711 may have a source configured to receive the first supply voltage VD1, a drain coupled to the output node ON, and a gate configured to receive the first output control signal MSBO. The second transistor 712 may have a drain coupled to the output node ON, a source configured to receive the second supply voltage VD2, and a gate configured to receive the first output control signal MSBO. The second output driver 720 may include a third transistor 721 and a fourth transistor 722. The third transistor 721 may be a P-channel MOS transistor, and the fourth transistor 722 may be an N-channel MOS transistor. The third transistor 721 may have a source configured to receive the first supply voltage VD1, a drain coupled to the output node ON, and a gate configured to receive the second output control signal LSBO. The fourth transistor 722 may have a drain coupled to the output node ON, a source configured to receive the second supply voltage VD2, and a gate configured to receive the second output control signal LSBO. The current driving force and/or size of the first transistor 711 may be larger than the current driving force and/or size of the third transistor 721. The size may correspond to the ratio of channel width to channel length in the corresponding transistor (W/L ratio). The current driving force and/or size of the second transistor 712 may be larger than the current driving force and/or size of the fourth transistor 722.

Figure 8:
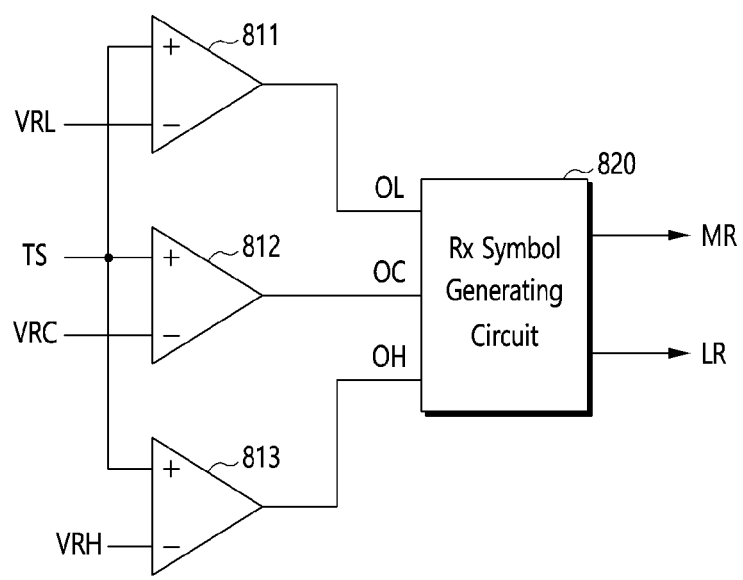
FIG. 8 is a diagram illustrating a configuration of a first receiver illustrated in FIG. 2.

FIG. 8 is a diagram illustrating the configuration of the first receiver 221-1 illustrated in FIG. 2. Referring to FIG. 8, the first receiver 221-1 may include a first comparator 811, a second comparator 812, a third comparator 813 and an Rx symbol generating circuit 820. The first comparator 811 may receive the Tx signal TS and a first reference voltage VRL. The first comparator 811 may generate a first voltage detection signal OL by comparing the voltage levels of the Tx signal TS and the first reference voltage VRL. The second comparator 812 may receive the Tx signal TS and a second reference voltage VRC. The second comparator 812 may generate a second voltage detection signal OC by comparing the voltage levels of the Tx signal TS and the second reference voltage VRC. The third comparator 813 may receive the Tx signal TS and a third reference voltage VRH. The third comparator 813 may generate a third voltage detection signal OH by comparing the voltage levels of the Tx signal TS and the third reference voltage VRH. The first reference voltage VRL may have a lower voltage level than the second reference voltage VRC, and the second reference voltage VRC may have a lower voltage level than the third reference voltage VRH. Referring to FIG. 8 with FIG. 1, the first reference voltage VRL may have a voltage level between the first voltage level V1 and the second voltage level V2, the second reference voltage VRC may have a voltage level between the second voltage level V2 and the third voltage level V3, and the third reference voltage VRH may have a voltage level between the third voltage level V3 and the fourth voltage level V4. Therefore, the first to third voltage detection signals OL, OC and OH generated through the first to third comparators 811 to 813 may specify the voltage level of the Tx signal TS.

The Rx symbol generating circuit 820 may receive the first to third voltage detection signals OL, OC and OH, and generate an Rx symbol based on the first to third voltage detection signals OL, OC and OH. For example, when the first to third voltage detection signals OL, OC and OH are all disabled, the Tx signal TS may be determined to have the first voltage level V1, and the Rx symbol generating circuit 820 may generate first and second bits MR and LR of the Rx symbol at a high logic level. When the first voltage detection signal OL is enabled and the second and third voltage detection signals OC and OH are disabled, the Tx signal TS may be determined to have the second voltage level V2, and the Rx symbol generating circuit 820 may generate the first bit MR of the Rx symbol at a high logic level, and generate the second bit LR of the Rx symbol at a low logic level. When the first and second voltage detection signals OL and OC are enabled and the third voltage detection signal OH is disabled, the Tx signal TS may be determined to have the third voltage level V3, and the Rx symbol generating circuit 820 may generate the first bit MR of the Rx symbol having a low logic level, and generate the second bit LR of the Rx symbol at a high logic level. When the first to third voltage detection signals OL, OC and OH are all enabled, the Tx signal TS may be determined to have the fourth voltage level V4, and the Rx symbol generating circuit 820 may generate the first and second bits MR and LR of the Rx symbol at a low logic level.

Figure 9:
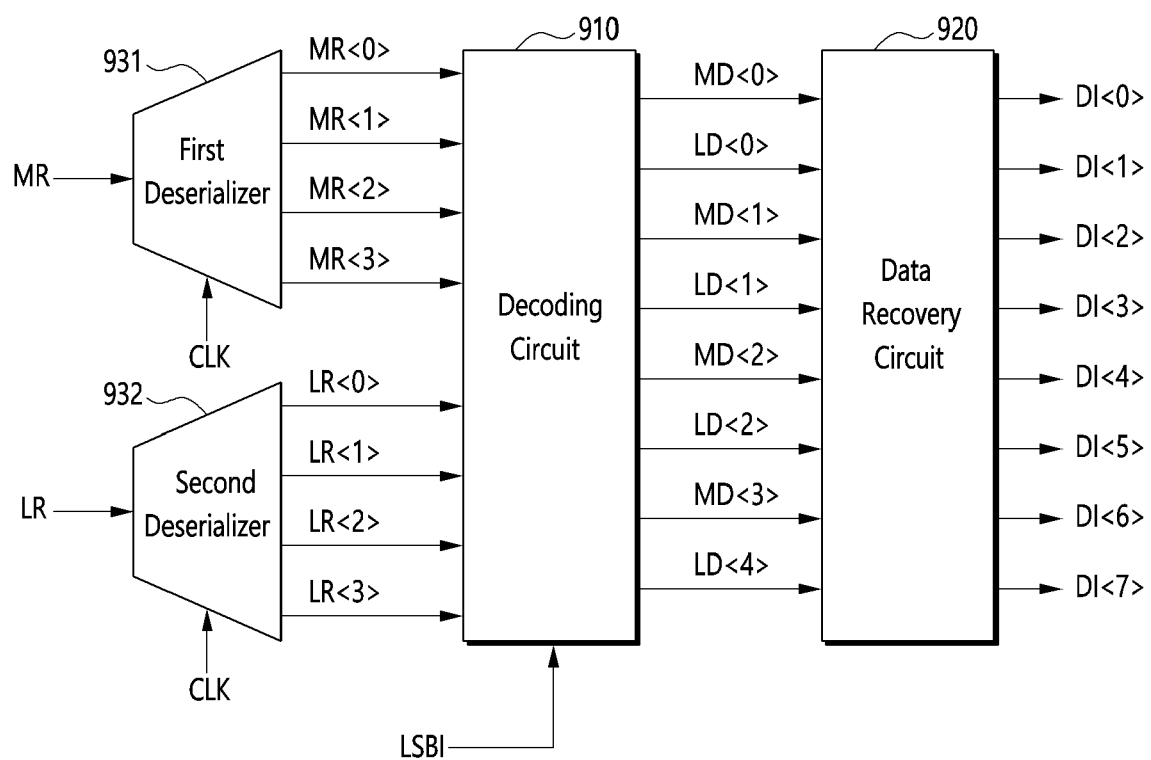
FIG. 9 is a diagram illustrating a configuration of an input control circuit illustrated in FIG. 2.

FIG. 9 is a diagram illustrating the configuration of the input control circuit 222 illustrated in FIG. 2. Referring to FIG. 9, the input control circuit 222 may include a decoding circuit 910. The decoding circuit 910 may sequentially receive the first to fourth Rx symbols MR<0:3> and LR<0:3>, and receive the inverted flag signal LSBI. The decoding circuit 910 may generate first to fourth decoded symbols MD<0:3> and LD<0:3> based on the first to fourth Rx symbols MR<0:3> and LR<0:3> and the inverted flag signal LSBI. The first to fourth decoded symbols MD<0:3> and LD<0:3> may be provided as the 8-bit input data stream DI<0:7>. The input control circuit 222 may further include a data recovery circuit 920. The data recovery circuit 920 may generate the input data stream DI<0:7> based on the first to fourth decoded symbols MD<0:3> and LD<0:3>. The data recovery circuit 920 may provide first and second bits MD<0:3> and LD<0:3> of the first to fourth decoded symbols as first to eighth bits DI<0:7> of the input data stream, respectively. The data recovery circuit 920 may provide the first bit MD<0> of the first decoded symbol as the first bit DI<0> of the input data stream, and provide the second bit LD<0> of the first decoded symbol as the second bit DI<0> of the input data stream. The data recovery circuit 920 may provide the first bit MD<1> of the second decoded symbol as the third bit DI<2> of the input data stream, and provide the second bit LD<1> of the second decoded symbol as the fourth bit DI<3> of the input data stream. The data recovery circuit 920 may provide the first bit MD<2> of the third decoded symbol as the fifth bit DI<4> of the input data stream, and provide the second bit LD<2> of the third decoded symbol as the sixth bit DI<5> of the input data stream. The data recovery circuit 920 may provide the first bit MD<3> of the fourth decoded symbol as the seventh bit DI<6> of the input data stream, and provide the second bit LD<3> of the fourth decoded symbol as the eighth bit DI<7> of the input data stream.

The decoding circuit 910 may invert the logic levels of the second bits LD<0:3> of the first to fourth Rx symbols based on the inverted flag signal LSBI. The decoding circuit 910 may invert the logic levels of the second bits LD<0:3> of the first to fourth Rx symbols, when the inverted flag signal LSBI is enabled. The decoding circuit 910 might not invert the logic levels of the second bits LD<0:3> of the first to fourth Rx symbols, but retain the logic levels of the second bits LD<0:3>, when the inverted flag signal LSBI is disabled. The decoding circuit 910 may invert the logic levels of the second bits of the first to fourth Rx symbols, detect whether the maximum transition is present among the first to fourth Rx symbols including the inverted second bits, and re-invert the second bits of the first and fourth Rx symbols according to whether the maximum transition is present. When the maximum transition is not present, the decoding circuit 910 may re-invert the logic levels of the inverted second bits of the first and fourth Rx symbols. When the maximum transition is present, the decoding circuit 910 might not invert the logic levels of the inverted second bits of the first and fourth Rx symbols, but retain the logic levels of the inverted second bits.

The input control circuit 222 may further include a first deserializer 931 and a second deserializer 932. The first and second deserializers 931 and 932 may sequentially receive the plurality of Rx symbols MR and LR output from the Rx symbol generating circuit 820 illustrated in FIG. 8, and generate the first to fourth Rx symbols MR<0:3> and LR<0:3> from the plurality of Rx symbols MR and LR. The first deserializer 931 may generate the first bits MR<0:3> of the first to fourth Rx symbols from the first bits MR of the plurality of Rx symbols. The first deserializer 931 may further receive the clock signal CLK, and provide the first bits MR of the plurality of Rx symbols as the first bits MR<0:3> of the first to fourth Rx symbols in synchronization with the clock signal CLK. For example, the first deserializer 931 may output the first bit MR of the Rx symbol generated for the first time as the first bit MR<0> of the first Rx symbol in synchronization with a first edge of the clock signal CLK, and output the first bit MR of the Rx symbol generated for the second time as the first bit MR<1> of the second Rx symbol in synchronization with a second edge of the clock signal CLK. The first deserializer 931 may output the first bit MR of the Rx symbol generated for the third time as the first bit MR<2> of the third Rx symbol in synchronization with a third edge of the clock signal CLK, and output the first bit MR of the Rx symbol generated for the fourth time as the first bit MR<3> of the fourth Rx symbol in synchronization with a fourth edge of the clock signal CLK.

The second deserializer 932 may generate the second bits LR<0:3> of the first to fourth Rx symbols from the second bits LR of the plurality of Rx symbols. The second deserializer 932 may further receive the clock signal CLK, and provide the second bits LR of the plurality of Rx symbols as the second bits LR<0:3> of the first to fourth Rx symbols in synchronization with the clock signal CLK. For example, the second deserializer 932 may output the second bit LR of the Rx symbol generated for the first time as the second bit LR<0> of the first Rx symbol in synchronization with the first edge of the clock signal CLK, and output the second bit LR of the Rx symbol generated for the second time as the second bit LR<1> of the second Rx symbol in synchronization with the second edge of the clock signal CLK. The second deserializer 932 may output the second bit LR of the Rx symbol generated for the third time as the second bit LR<2> of the third Rx symbol in synchronization with the third edge of the clock signal CLK, and output the second bit LR of the Rx symbol generated for the fourth time as the second bit LR<3> of the fourth Rx symbol in synchronization with the fourth edge of the clock signal CLK.

Figure 10:
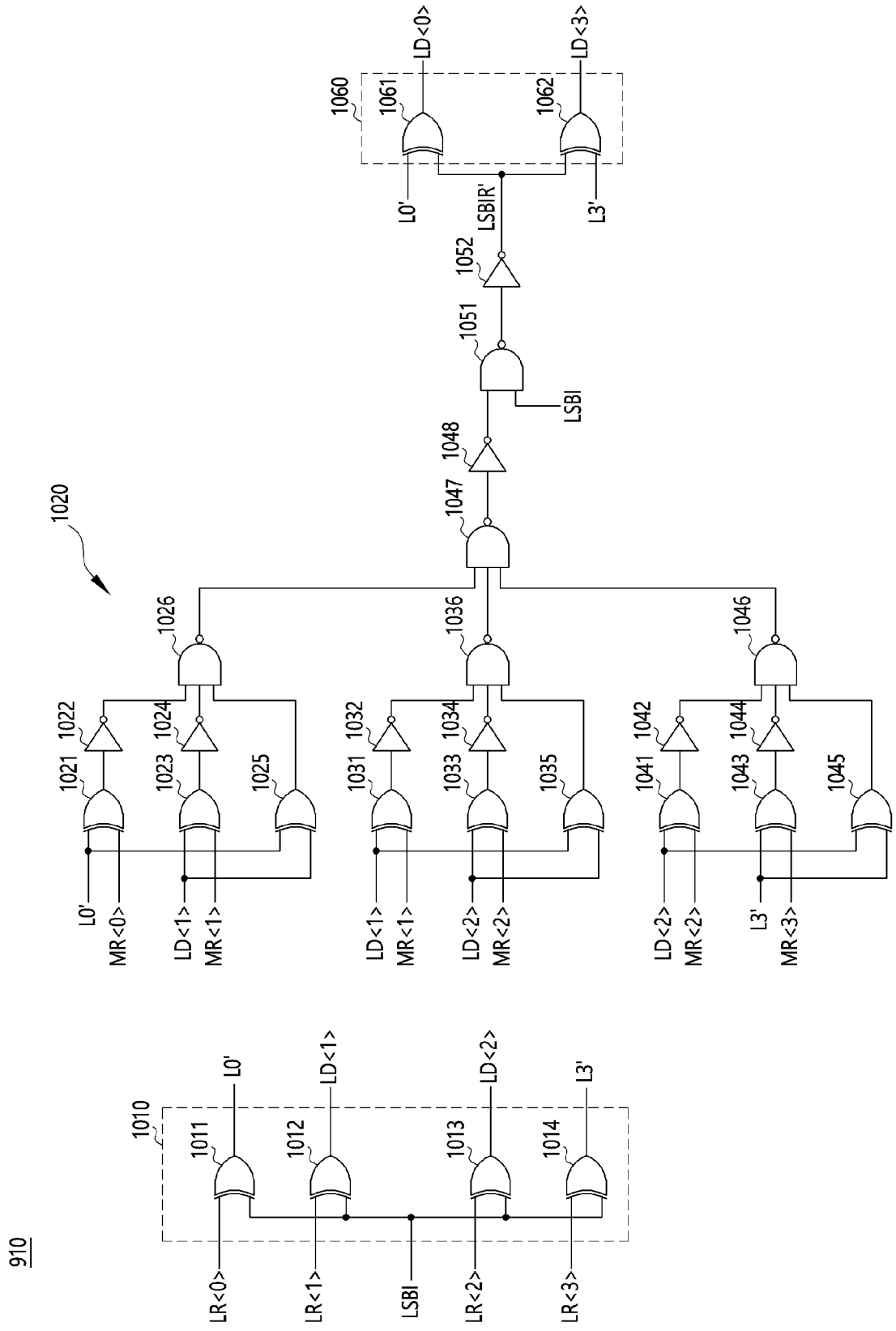
FIG. 10 is a diagram illustrating a configuration of a decoding circuit illustrated in FIG. 9.

FIG. 10 is a diagram illustrating the configuration of the decoding circuit 910 illustrated in FIG. 9. Referring to FIG. 9, the decoding circuit 910 may include a bit inverting circuit 1010, a detection circuit 1020 and a bit re-inverting circuit 1060. The bit inverting circuit 1010 may receive the inverted flag signal LSBI and the second bits LR<0:3> of the first to fourth Rx symbols. The bit inverting circuit 1010 may invert the logic levels of the second bits LR<0:3> of the first to fourth Rx symbols based on the inverted flag signal LSBI. When the inverted flag signal LSBI is enabled, the bit inverting circuit 1010 may invert the logic levels of the second bits LR<0:3> of the first to fourth Rx symbols. The bit inverting circuit 1010 might not invert the logic levels of the second bits LR<0:3> of the first to fourth Rx symbols, but retain the logic levels of the second bits LR<0:3>, when the inverted flag signal LSBI is disabled.

The detection circuit 1020 may receive the inverted second bits output from the bit inverting circuit 1010 and the first bits MR<0:3> of the first to fourth symbols. The detection circuit 1020 may generate a re-inverted flag signal LSBIR' by comparing the logic levels of the first bits MR<0:3> and the inverted second bits of the first to fourth symbols. The detection circuit 1020 may compare the logic levels of the first bits and the inverted second bits of the first to fourth Rx symbols, and compare the logic levels of the inverted second bits of adjacent Rx symbols. The bit re-inverting circuit 1060 may receive the re-inverted flag signal LSBIR' and the inverted second bits of the first and fourth Rx symbols. When the re-inverted flag signal LSBIR' is enabled, the bit re-inverting circuit 1060 may re-invert the inverted second bits of the first and fourth Rx symbols. When the re-inverted flag signal LSBIR' is disabled, the bit re-inverting circuit 1060 might not re-invert the inverted second bits of the first and fourth Rx symbols, and retain the logic levels of the inverted second bits.

The first bits MR<0:3> of the first to fourth Rx symbols may be provided as the first bits MD<0:3> of the first to fourth decoded symbols, respectively. The first bit MR<0> of the first Rx symbol may be provided as the first bit MD<0> of the first decoded symbol, and the first bit MR<1> of the second Rx symbol may be provided as the first bit MD<1> of the second decoded symbol. The first bit MR<2> of the third Rx symbol may be provided as the first bit MD<2> of the third decoded symbol, and the first bit MR<3> of the fourth Rx symbol may be provided as the first bit MD<3> of the fourth decoded symbol. The inverted second bits of the second and third Rx symbols output from the bit inverting circuit 1010 may be provided as the second bits LD<2:3> of the second and third decoded symbols, respectively. The inverted second bit of the second Rx symbol may be provided as the second bit LD<2> of the second decoded symbol, and the inverted second bit of the third Rx symbol may be provided as the second bit LD<3> of the third decoded symbol. The re-inverted second bits of the first and fourth Rx symbols output from the bit re-inverting circuit 1060 may be provided as the second bits LD<0> and LD<3> of the first and fourth decoded symbols, respectively. The re-inverted second bit of the first Rx symbol may be provided as the second bit LD<0> of the first decoded symbol, and the re-inverted second bit of the fourth Rx symbol may be provided as the second bit LD<3> of the fourth decoded symbol.

The bit inverting circuit 1010 may include a first XOR gate 1011, a second XOR gate 1012, a third XOR gate 1013 and a fourth XOR gate 1014. The first XOR gate 1011 may receive the second bit LR<0> of the first Rx symbol and the inverted flag signal LSBI. The first XOR gate 1011 may invert the logic level of the second bit LR<0> of the first Rx symbol when the inverted flag signal LSBI is at a high logic level, and retain the logic level of the second bit LR<0> of the first Rx symbol when the inverted flag signal LSBI is at a low logic level. The second XOR gate 1012 may receive the second bit LR<1> of the second Rx symbol and the inverted flag signal LSBI. The second XOR gate 1012 may invert the logic level of the second bit LR<1> of the second Rx symbol when the inverted flag signal LSBI is at a high logic level, and retain the logic level of the second bit LR<1> of the second Rx symbol when the inverted flag signal LSBI is at a low logic level. The third XOR gate 1013 may receive the second bit LR<2> of the third Rx symbol and the inverted flag signal LSBI. The third XOR gate 1013 may invert the logic level of the second bit LR<2> of the third Rx symbol when the inverted flag signal LSBI is at a high logic level, and retain the logic level of the second bit LR<2> of the third Rx symbol when the inverted flag signal LSBI is at a low logic level. The fourth XOR gate 1014 may receive the second bit LR<3> of the fourth Rx symbol and the inverted flag signal LSBI. The fourth XOR gate 1014 may invert the logic level of the second bit LR<3> of the fourth Rx symbol when the inverted flag signal LSBI is at a high logic level, and retain the logic level of the second bit LR<3> of the fourth Rx symbol when the inverted flag signal LSBI is at a low logic level. The output of the second XOR gate 1012 of the bit inverting circuit 1010 may be provided as the second bit LD<1> of the second decoded symbol, and the output of the third XOR gate 1013 may be provided as the second bit LD<2> of the third decoded symbol.

The detection circuit 1020 may include a first XOR gate 1021, a first inverter 1022, a second XOR gate 1023, a second inverter 1024, a third XOR gate 1025, a first NAND gate 1026, a fourth XOR gate 1031, a third inverter 1032, a fifth XOR gate 1033, a fourth inverter 1034, a sixth XOR gate 1035, a second NAND gate 1036, a seventh XOR gate 1041, a fifth inverter 1042, an eighth XOR gate 1043, a sixth inverter 1044, a ninth XOR gate 1045, a third NAND gate 1046, a fourth NAND gate 1047, a seventh inverter 1048, a fifth NAND gate 1051 and an eighth inverter 1052. The first XOR gate 1021 may receive the first bit MR<0> of the first Rx symbol and an output L0' of the first XOR gate 1011 of the bit inverting circuit 1010, and compare the logic levels of the first bit MR<0> of the first Rx symbol and the output L0' of the first XOR gate 1011. The first inverter 1022 may invert the logic level of the output of the first XOR gate 1011. The second XOR gate 1023 may receive the first bit MR<1> of the second Rx symbol and an output LD<1> of the second XOR gate 1012 of the bit inverting circuit 1010, and compare the logic levels of the first bit MR<1> of the second Rx symbol and the output LD<1> of the second XOR gate 1012. The second inverter 1024 may invert the logic level of the output of the second XOR gate 1023. The third XOR gate 1025 may receive the output L0' of the first XOR gate 1011 and the output LD<1> of the second XOR gate 1012, and compare the logic levels of the output L0' of the first XOR gate 1011 and the output LD<1> of the second XOR gate 1012. The first NAND gate 1026 may perform a NAND operation on the outputs of the first inverter 1022, the second inverter 1024 and the third XOR gate 1025.

The fourth XOR gate 1031 may receive the first bit MR<1> of the second Rx symbol and the output LD<1> of the second XOR gate 1012 of the bit inverting circuit 1010, and compare the logic levels of the first bit MR<1> of the second Rx symbol and the output LD<1> of the second XOR gate 1012. The third inverter 1032 may invert the logic level of an output of the fourth XOR gate 1031. The fifth XOR gate 1033 may receive the first bit MR<2> of the third Rx symbol and an output LD<2> of the third XOR gate 1013 of the bit inverting circuit 1010, and compare the logic levels of the first bit MR<2> of the third Rx symbol and the output LD<2> of the third XOR gate 1013. The fourth inverter 1034 may invert the logic level of an output of the fifth XOR gate 1033. The sixth XOR gate 1035 may receive the output LD<1> of the second XOR gate 1012 and the output LD<2> of the third XOR gate 1013, and compare the logic levels of the output LD<1> of the second XOR gate 1012 and the output LD<2> of the third XOR gate 1013. The second NAND gate 1036 may perform a NAND operation on outputs of the third inverter 1032, the fourth inverter 1034 and the sixth XOR gate 1035.

The seventh XOR gate 1041 may receive the first bit MR<2> of the third Rx symbol and the output LD<2> of the third XOR gate 1013 of the bit inverting circuit 1010, and compare the logic levels of the first bit MR<2> of the third Rx symbol and the output LD<2> of the third XOR gate 1013. The fifth inverter 1042 may invert the logic level of an output of the seventh XOR gate 1041. The eighth XOR gate 1043 may receive the first bit MR<3> of the fourth Rx symbol and an output L3' of the fourth XOR gate 1014 of the bit inverting circuit 1010, and compare the logic levels of the first bit MR<3> of the fourth Rx symbol and the output L3' of the fourth XOR gate 1014. The sixth inverter 1044 may invert the logic level of an output of the eighth XOR gate 1043. The ninth XOR gate 1045 may receive the output LD<2> of the third XOR gate 1013 and the output L3' of the fourth XOR gate 1014, and compare the logic levels of the output LD<2> of the third XOR gate 1013 and the output L3' of the fourth XOR gate 1014. The third NAND gate 1046 may perform a NAND operation on outputs of the fifth inverter 1042, the sixth inverter 1044 and the ninth XOR gate 1045.

The fourth NAND gate 1047 may receive outputs of the first to third NAND gates 1026, 1036 and 1046, and perform a NAND operation on the outputs of the first to third NAND gates 1026, 1036 and 1046. The seventh inverter 1048 may invert the logic level of an output of the fourth NAND gate 1047. The fifth NAND gate 1051 may receive an output of the seventh inverter 1048 and the inverted flag signal LSBI, and perform a NAND operation on the output of the seventh inverter 1048 and the inverted flag signal LSBI. The eighth inverter 1052 may invert the logic level of an output of the fifth NAND gate 1051. The fifth NAND gate 1051 and the eighth inverter 1052 may decide whether to enable the re-inverted flag signal LSBIR' according to whether the inverted flag signal LSBI is enabled. When the inverted flag signal LSBI is disabled to a low logic level, the re-inverted flag signal LSBIR' may be disabled to a low logic level, regardless of the logic level of the output of the seventh inverter 1048. The fifth NAND gate 1051 and the eighth inverter 1052 may output the output of the seventh inverter 1048 as the valid re-inverted flag signal LSBIR', when the inverted flag signal LSBI is enabled.

The bit re-inverting circuit 1060 may include a first XOR gate 1061 and a second XOR gate 1062. The first XOR gate 1061 may receive the output of the first XOR gate 1011 of the bit inverting circuit 1010 and the re-inverted flag signal LSBIR'. The first XOR gate 1061 may invert the logic level of the output L0' of the first XOR gate 1011 of the bit inverting circuit 1010 when the re-inverted flag signal LSBIR' is at a high logic level, and retain the logic level of the output L0' of the first XOR gate 1011 when the re-inverted flag signal LSBIR' is at a low logic level. The second XOR gate 1062 may receive the output L3' of the fourth XOR gate 1014 of the bit inverting circuit 1010 and the re-inverted flag signal LSBIR'. The second XOR gate 1062 may invert the logic level of the output L3' of the fourth XOR gate 1014 of the bit inverting circuit 1010 when the re-inverted flag signal LSBIR' is at a high logic level, and retain the logic level of the output L3' of the fourth XOR gate 1014 when the re-inverted flag signal LSBIR' is at a low logic level. The output of the first XOR gate 1061 of the bit re-inverting circuit 1060 may be provided as the second bit LD<0> of the first decoded symbol, and an output of the second XOR gate 1062 may be provided as the second bit LD<3> of the fourth decoded symbol.

FIGS. 11A and 11B are tables showing symbols and Tx signals, which are generated through the signal transmitting device 210 in accordance with the present embodiment. Referring to FIGS. 1 to 10, 11A and 11B, operations of the signal transmitting device 210 and the transmitting and receiving system 200 in accordance with the present embodiment will be described as follows. As shown in FIG. 11A, when the first bit DO<0> of the output data stream is at a high logic level, the second bit DO<1> thereof is at a low logic level, and the third to eighth bits DO<2:7> thereof are at a high logic level, the first bit M<0> of the first symbol may have a high logic level, and the second bit L<0> of the first symbol may have a low logic level. The first bits M<1:3> and the second bits L<1:3> of the second to fourth symbols may each have a high logic level. The voltage level of the Tx signal TS generated based on the first to fourth symbols may be changed from the third voltage level V3 to the first voltage level V1, and retain the first voltage level V1. The maximum transition might not occur among the first to fourth symbols M<0:3> and L<0:3>, and the encoding circuit 510 may provide the first to fourth symbols M<0:3> and L<0:3> as the first to fourth encoded symbols ME<0:3> and LE<0:3>. Furthermore, the encoding circuit 510 may disable the inverted flag signal LSBI to a low logic level, and not invert the logic levels of the second bits L<0:3> of the first to fourth symbols. The first bits ME<0:3> and the second bits LE<0:3> of the first to fourth encoded symbols may be sequentially provided as the first output control signal MSBO and the second output control signal LSBO, and the first transmitter 212-1 may transmit the Tx signal TS having the third voltage level V3 and the first voltage level V1.

The first receiver 221-1 may receive the Tx signal TS, and the first bit MR<0> of the first Rx symbol may have a high logic level and the second bit LR<0> thereof may have a low logic level. The first bits MR<1:3> and the second bits LR<1:3> of the second to fourth Rx symbols may each have a high logic level. Since the decoding circuit 910 receives the inverted flag signal LSBI having a low logic level, the decoding circuit 910 might not invert the logic levels of the second bits LR<0:3> of the first to fourth Rx symbols, but provide the first to fourth Rx symbols MR<0:3> and LR<0:3> as the first to fourth decoded symbols MD<0:3> and LD<0:3>. The data recovery circuit 920 may recover the input data stream DI<0:7> based on the first to fourth decoded symbols MD<0:3> and LD<0:3>. The first bit DI<0> of the input data stream may have a high logic level, the second bit DI<1> thereof may have a low logic level, and the third to eighth bits DI<2:7> may each have a high logic level. Therefore, the input data stream DI<0:7> having the same logic value as the output data stream DO<0:7> may be generated.

When the first and second bits DO<0:1> of the output data stream are at a low logic level and the third to eighth bits DO<2:7> of the output data stream are at a high logic level, the first bit M<0> and the second bit L<0> of the first symbol may each have a low logic level, and the first bits M<1:3> and the second bits L<1:3> of the second to fourth symbols may each have a high logic level. The Tx signal TS generated based on the first to fourth symbols M<0:3> and L<0:3> may be fully swung from the fourth voltage level V4 to the first voltage level V1, and retain the first voltage level V1. Since the maximum transition occurs among the first and second symbols M<0:1> and L<0:1>, the encoding circuit 510 may enable the inverted flag signal LSBI to a high logic level, and invert the logic levels of the second bits L<0:3> of the first to fourth symbols. The inverted second bit of the first symbol may have a high logic level, and the inverted second bits of the second to fourth symbols may each have a low logic level. The maximum transition might not occur among the first to fourth symbols including the inverted second bits, and the first to fourth symbols including the inverted second bits may be provided as the first to fourth encoded symbols ME<0:3> and LE<0:3>. The first bit ME<0> of the first encoded symbol may have a low logic level, and the second bit LE<0> of the first encoded symbol may have a high logic level. The first bits ME<1:3> of the second to fourth encoded symbols may each have a high logic level, and the second bits LE<0:3> of the second to fourth encoded symbols may each have a low logic level. The first bits ME<0:3> and the second bits LE<0:3> of the first to fourth encoded symbols may be sequentially provided as the first output control signal MSBO and the second output control signal LSBO, and the first transmitter 212-1 may transmit the Tx signal TS whose voltage level is changed from the second voltage level V2 to the third voltage level V3 and which retains the third voltage level V3. Therefore, the Tx signal TS might not be fully swung, the power consumption required for transmitting the Tx signal TS may be reduced, and the valid window of the Tx signal TS may be improved.

The first receiver 221-1 may receive the Tx signal TS, and generate the first to fourth Rx symbols MR<0:3> and LE<0:3> from the Tx signal TS. The first bit MR<0> of the first Rx symbol may have a low logic level, and the second bit LR<0> of the first Rx symbol may have a high logic level. The first bits MR<1:3> of the second to fourth Rx symbols may each have a high logic level, and the second bits LR<1:3> of the second to fourth Rx symbols may each have a low logic level. Since the decoding circuit 910 receives the inverted flag signal LSBI having a high logic level, the decoding circuit 910 may invert the logic levels of the second bits LR<0:3> of the first to fourth Rx symbols. The inverted second bit of the first Rx symbol may have a low logic level, and the inverted second bits of the second to fourth Rx symbols may each have a high logic level. The decoding circuit 910 may provide the first to fourth Rx symbols including the inverted second bits as the first to fourth decoded symbols MD<0:3> and LD<0:3>. The first bit MD<0> and the second bit LD<0> of the first decoded symbol may each have a low logic level, and the first bits MD<1:3> and the second bits LD<1:3> of the second to fourth decoded symbols may each have a high logic level. The data recovery circuit 920 may generate the input data stream DI<0:7> based on the first to fourth decoded symbols MD<0:3> and LD<0:3>. Since the first bit DI<0> and the second bit DI<1> of the input data stream each have a low logic level and the third to eighth bits DI<2:7> thereof each have a high logic level, the input data stream DI<0:7> having the same logic value as the output data stream DO<0:7> may be generated.

As illustrated in FIG. 11B, when the first bit DO<0>, the second bit DO<1>, the fifth bit DO<4> and the seventh bit DO<7> of the output data stream each have a low logic level and the third bit DO<2>, the fourth bit DO<3>, the sixth bit DO<5> and the seventh bit DO<6> thereof each have a high logic level, the first bit M<0> and the second bit L<0> of the first symbol may each have a low logic level, the first bit M<1> and the second bit L<1> of the second symbol may each have a high logic level, the first bit M<2> and the second bit L<2> of the third symbol may have a low logic level and a high logic level, respectively, and the first bit M<3> and the second bit L<3> of the fourth symbol may have a high logic level and a low logic level, respectively. The Tx signal TS generated based on the first to fourth symbols M<0:3> to L<0:3> may be fully swung from the fourth voltage level V4 to the first voltage level V1, changed from the first voltage level V1 to the second voltage level V2, and changed from the second voltage level V2 to the third voltage level V3. Since the maximum transition occurs among the first and second symbols M<0:1> and L<0:1>, the encoding circuit 510 may enable the inverted flag signal LSBI to a high logic level, and invert the logic levels of the second bits L<0:3> of the first to fourth symbols. The inverted second bits L<0>' and L<3>' of the first and fourth symbols may each have a high logic level, and the inverted second bits L<1>' and L<2>' of the second and third symbols may each have a low logic level. The Tx signal TS generated based on the first to fourth symbols including the inverted second bits L<0>', L<1>', L<2>' and L<3>' may be changed from the second voltage level V2 to the third voltage level V3, changed from the third voltage level V3 to the fourth voltage level V4, and fully swung from the fourth voltage level V4 to the first voltage level V1. Therefore, the maximum transition may occur again between the third and fourth symbols including the inverted second bits L<2>' and L<3>'. The encoding circuit 510 may re-invert the logic levels of the inverted second bits L<0>' and L<3>' of the first and fourth symbols which are the edge symbols. Therefore, the re-inverted second bits of the first and fourth symbols may each have a low logic level again. The first bit ME<0> and the second bit LE<0> of the first encoded symbol may each have a low logic level, the first bit ME<1> and the second bit LE<1> of the second encoded symbol may have a high logic level and a low logic level, respectively, the first bit ME<2> and the second bit LE<2> of the third encoded symbol may each have a low logic level, and the first bit ME<3> and the second bit LE<3> of the fourth encoded symbol may have a high logic level and a low logic level, respectively. The first bits ME<0:3> and the second bits LE<0:3> of the first to fourth encoded symbols may be sequentially provided as the first output control signal MSBO and the second output control signal LSBO, and the first transmitter 212-1 may transmit the Tx signal TS which is changed from the fourth voltage level V4 to the third voltage level V3, changed from the third voltage level V3 to the fourth voltage level V4, and changed from the fourth voltage level V4 to the third voltage level V3. Therefore, the Tx signal TS might not be fully swung, the power consumption required for transmitting the Tx signal TS may be reduced, and the valid window of the Tx signal TS may be improved.

The first receiver 221-1 may receive the Tx signal TS, and generate the first to fourth Rx symbols MR<0:3> and LR<0:3> from the Tx signal TS. The first bit MR<0> and the second bit LR<0> of the first Rx symbol may each have a low logic level, the first bit MR<1> and the second bit LR<1> of the second Rx symbol may have a high logic level and a low logic level, respectively, the first bit MR<2> and the second bit LR<2> of the third Rx symbol may each have a low logic level, and the first bit MR<3> and the second bit LR<3> of the fourth Rx symbol may have a low logic level and a high logic level, respectively. Since the decoding circuit 910 receives the inverted flag signal LSBI having a high logic level, the decoding circuit 910 may invert the logic levels of the second bits LR<0:3> of the first to fourth Rx symbols. Therefore, the inverted second bits of the first to fourth Rx symbols may each have a high logic level, and the maximum transition might not be present among the first to fourth Rx symbols including the inverted second bits. When it is determined that the maximum transition is not present among the first to fourth symbols including the inverted second bits, the decoding circuit 910 may re-invert the logic levels of the inverted second bits of the first and fourth Rx symbols which are the edge symbols. Therefore, the re-inverted second bits of the first and fourth Rx symbols may each have a low logic level again. The first bit MD<0> and the second bit LD<0> of the first decoded symbol may each have a low logic level, the first bit MD<1> and the second bit LD<1> of the second decoded symbol may each have a high logic level, the first bit MD<2> and the second bit LD<2> of the third decoded symbol may have a low logic level and a high logic level, respectively, and the first bit MD<3> and the second bit LD<3> of the fourth decoded symbol may have a high logic level and a low logic level, respectively. The data recovery circuit 920 may generate the input data stream DI<0:7> based on the first to fourth decoded symbols MD<0:3> and LD<0:3>. Since the first bit DI<0> and the second bit DI<1> of the input data stream each have a low logic level, the third bit DI<2> and the fourth bit DI<3> thereof each have a high logic level, the fifth bit DI<4> and the eighth bit DI<7> thereof each have a low logic level, and the sixth bit DI<5> and the seventh bit DI<6> thereof each have a high logic level, the input data stream DI<0:7> having the same logic value as the output data stream DO<0:7> may be generated.

While various embodiments have been described above, it will be understood to those skilled in the art that the embodiments described are examples only. Accordingly, the signal transmitting circuit, the signal receiving circuit, the transmitting and receiving system using the same, and the transmitting and receiving method, which are described herein, should not be limited based on the described embodiments.

What is claimed is:

1. A signal transmitting device comprising:
   an output control circuit configured to generate a first symbol, a second symbol, a third symbol, and a fourth symbol each having a first bit and a second bit corresponding to an output data stream, generate a first encoded symbol, a second encoded symbol, a third encoded symbol, and a fourth encoded symbol and an inverted flag signal by inverting the logic levels of the second bits of the first symbol, the second symbol, the third symbol, and the fourth symbol, and generate a first output control signal and a second output control signal based on the first to fourth encoded symbols, when the maximum transition is present among the first to fourth symbols; and
   a transmitting circuit configured to transmit the inverted flag signal and a Tx (Transmit) signal generated based on the first and second output control signals.

2. The signal transmitting device according to claim 1, wherein the output control circuit inverts the second bits of the first to fourth symbols, and then generates the first to fourth encoded symbols by re-inverting the logic levels of the inverted second bits of the first and fourth symbols, when the maximum transition is present among the first to fourth symbols including the inverted second bits.

3. The signal transmitting device according to claim 2, wherein the output control circuit comprises an encoding circuit,
   wherein the encoding circuit comprises:
   a first detection circuit configured to detect the logic levels of the first bits and the second bits of the first to fourth symbols, and generate the inverted flag signal according to whether the maximum transition is present among the first to fourth symbols;
   a bit inverting circuit configured to invert the logic levels of the second bits of the first to fourth symbols based on the inverted flag signal;
   a second detection circuit configured to detect the logic levels of the first bits and the inverted second bits of the first to fourth symbols, and generate a re-inverted flag signal according to whether the maximum transition is present; and
   a bit re-inverting circuit configured to re-invert the logic levels of the inverted second bits of the first and fourth symbols based on the re-inverted flag signal,
   wherein the first bits of the first to fourth symbols are provided as first bits of the first to fourth encoded symbols, respectively, the inverted second bits of the second and third symbols are provided as second bits of the second and third encoded symbols, respectively, and the re-inverted second bits of the first and fourth symbols are provided as second bits of the first and fourth encoded symbols, respectively.

4. The signal transmitting device according to claim 3, wherein the output control circuit further comprises:
   a first serializer configured to sequentially output the first bits of the first to fourth encoded symbols as a first output control signal in synchronization with a clock signal; and
   a second serializer configured to sequentially output the second bits of the first to fourth encoded symbols as a second output control signal in synchronization with the clock signal.

5. The signal transmitting device according to claim 1, wherein the transmitting circuit comprises:
   a first transmitter configured to generate the Tx signal based on the first and second output control signals; and
   a second transmitter configured to transmit the inverted flag signal.

6. The signal transmitting device according to claim 5, wherein the first transmitter comprises:
   a first output driver configured to pull up and down an output node based on the first output control signal, and output the Tx signal through the output node; and
   a second output driver configured to pull up and down the output node based on the second output control signal,
   wherein the first output driver to pull up and down the output node has a larger driving force than the second output driver to pull up and down the output node.

7. A transmitting and receiving system comprising:
   a signal transmitting device configured to transmit a Tx (Transmit) signal having a plurality of voltage levels; and
   a signal receiving device configured to receive the Tx signal,
   wherein the signal transmitting device comprises:
   an output control circuit configured to generate a first symbol, a second symbol, a third symbol, and a fourth symbol each having a first bit and a second bit corresponding to an output data stream, generate a first encoded symbol, a second encoded symbol, a third encoded symbol, and a fourth encoded symbol and an inverted flag signal by inverting the logic levels of second bits of a first symbol, a second symbol, a third symbol, and a fourth symbol, and generate a first output control signal and a second output control signal based on the first to fourth encoded symbols, when the maximum transition is present among the first to fourth symbols; and a transmitting circuit configured to transmit the inverted flag signal and a Tx signal generated based on the first and second output control signals, wherein the signal receiving device comprises:

a receiving circuit configured to generate a Rx (Receive) symbol based on the Tx signal, and receive the inverted flag signal; and an input control circuit configured to recover the first to fourth symbols based on the Rx symbol and the inverted flag signal.

8. The transmitting and receiving system according to claim 7, wherein the output control circuit inverts the logic levels of the second bits of the first to fourth symbols, and then generates the first to fourth encoded symbols by re-inverting the logic levels of the inverted second bits of the first and fourth symbols, when the maximum transition is present among the first to fourth symbols including the inverted second bits.

9. The transmitting and receiving system according to claim 8, wherein the output control circuit comprises an encoding circuit, wherein the encoding circuit comprises:

a first detection circuit configured to detect the logic levels of the first bits and the second bits of the first to fourth symbols, and generate the inverted flag signal according to whether the maximum transition is present among the first to fourth symbols;

a bit inverting circuit configured to invert the logic levels of the second bits of the first to fourth symbols based on the inverted flag signal;

a second detection circuit configured to detect the logic levels of the first bits and the inverted second bits of the first to fourth symbols, and generate a re-inverted flag signal according to whether the maximum transition is present; and a bit re-inverting circuit configured to re-invert the logic levels of the inverted second bits of the first and fourth symbols based on the re-inverted flag signal, wherein the first bits of the first to fourth symbols are provided as first bits of the first to fourth encoded symbols, respectively, the inverted second bits of the second and third symbols are provided as second bits of the second and third encoded symbols, respectively, and the re-inverted second bits of the first and fourth symbols are provided as second bits of the first and fourth encoded symbols, respectively.

10. The transmitting and receiving system according to claim 9, wherein the output control circuit further comprises:

a first serializer configured to sequentially output the first bits of the first to fourth encoded symbols as a first output control signal in synchronization with a clock signal; and a second serializer configured to sequentially output the second bits of the first to fourth encoded symbols as a second output control signal in synchronization with the clock signal.

11. The transmitting and receiving system according to claim 7, wherein the transmitting circuit comprises:

a first transmitter configured to generate the Tx signal based on the first and second output control signals; and a second transmitter configured to transmit the inverted flag signal.

12. The signal transmitting and receiving system according to claim 11, wherein the first transmitter comprises:

a first output driver configured to pull up and down an output node based on the first output control signal, and output the Tx signal through the output node; and a second output driver configured to pull up and down the output node based on the second output control signal, wherein the first output driver to pull up and down the output node has larger drivability than the second output driver to pull up and down the output node.

13. The transmitting and receiving system according to claim 7, wherein the receiving circuit comprises:

a plurality of comparators configured to generate a plurality of voltage detection signals by comparing the Tx signal to a plurality of reference voltages having different voltage levels; and an Rx symbol generating circuit configured to generate the Rx symbol having at least a first bit and a second bit based on the plurality of voltage detection signals.

14. The transmitting and receiving system according to claim 13, wherein the input control circuit generates a first decoded symbol, a second decoded symbol, a third decoded symbol and a fourth decoded symbol by inverting the logic levels of second bits of a first Rx symbol, a second Rx symbol, a third Rx symbol and a fourth Rx symbol, which are generated from the Rx symbol, based on the inverted flag signal.

15. The transmitting and receiving system according to claim 14, wherein the input control circuit inverts the logic levels of the second bits of the first to fourth Rx symbols, and then re-inverts the logic levels of the inverted second bits of the first and fourth Rx symbols, when the maximum transition is not present among the first to fourth Rx symbols including the inverted second bits.

16. The transmitting and receiving system according to claim 15, wherein the input control circuit comprises a decoding circuit, wherein the decoding circuit comprises:

a bit inverting circuit configured to invert the logic levels of the second bits of the first to fourth Rx symbols based on the inverted flag signal;

a detection circuit configured to detect the logic levels of the first bits and the inverted second bits of the first to fourth Rx symbols, and generate a re-inverted flag signal according to whether the maximum transition is present among the first to fourth Rx symbols; and a bit re-inverting circuit configured to re-invert the logic levels of the inverted second bits of the first and fourth Rx symbols based on the re-inverted flag signal, wherein the first bits of the first to fourth Rx symbols are provided as first bits of the first to fourth decoded symbols, respectively, the inverted second bits of the second and third Rx symbols are provided as second bits of the second and third decoded symbols, respectively, and the re-inverted second bits of the first and fourth Rx symbols are provided as second bits of the first and fourth decoded symbols, respectively.

17. The transmitting and receiving system according to claim 16, wherein the input control circuit further comprises:

a first deserializer configured to sequentially provide the first bit of the Rx symbol as the first bits of the first to fourth Rx symbols in synchronization with a clock signal; and a second deserializer configured to sequentially provide the second bit of the Rx symbol as the second bits of the first to fourth Rx symbols in synchronization with the clock signal.

18. A transmitting and receiving method comprising:

generating a first symbol, a second symbol, a third symbol, and a fourth symbol, each of which includes a first bit and a second bit, based on a plurality of data;

generating an inverted flag signal, inverting the logic levels of the second bits of the first to fourth symbols, and providing the first to fourth symbols including the inverted second bits as a first encoded symbol, a second encoded symbol, a third encoded symbol, and a fourth encoded symbol, when the maximum transition is present among the first to fourth symbols; and transmitting the inverted flag signal and a Tx (Transmit) signal generated based on the first to fourth encoded symbols.

19. The transmitting and receiving method according to claim 18, further comprising re-inverting the inverted second bits of the first and fourth symbols when the maximum transition is present among the first to fourth symbols including the inverted second bits after the logic levels of the second bits of the first to fourth symbols are inverted, and providing the second and third symbols including the inverted second bits as the second and third encoded symbols, and providing the first and fourth symbols including the re-inverted second bits as the first and fourth encoded symbols.

20. The transmitting and receiving method according to claim 19, further comprising receiving the Tx signal, generating a first Rx symbol, a second Rx symbol, a third Rx symbol and a fourth Rx symbol, and receiving the inverted flag signal; and inverting the logic levels of the second bits of the first to fourth Rx symbols based on the inverted flag signal, and providing a first Rx (Receive) symbol, a second Rx symbol, a third Rx symbol, and a fourth Rx symbol, which include the inverted second bits, as a first decoded symbol, a second decoded symbol, a third decoded symbol, and a fourth decoded symbol.

21. The transmitting and receiving method according to claim 20, further comprising re-inverting the inverted second bits of the first and fourth Rx symbols when the maximum transition is not present among the first to fourth Rx symbols including the inverted second bits after the logic levels of the second bits of the first to fourth Rx symbols are inverted, and providing the second and third Rx symbols including the inverted second bits as the second and third decoded symbols, and providing the first and fourth Rx symbols including the re-inverted second bits as the first and fourth decoded symbols.

* * * * *